United States Patent
Miyatake

(10) Patent No.: US 10,808,062 B2
(45) Date of Patent: Oct. 20, 2020

(54) POLYOL COMPOSITION AND THERMOSETTING RESIN

(71) Applicant: KANEKA CORPORATION, Osaka (JP)

(72) Inventor: Nobuo Miyatake, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 59 days.

(21) Appl. No.: 16/109,245

(22) Filed: Aug. 22, 2018

(65) Prior Publication Data

US 2018/0362694 A1    Dec. 20, 2018

Related U.S. Application Data

(63) Continuation of application No. PCT/JP2017/006005, filed on Feb. 17, 2017.

(30) Foreign Application Priority Data

Feb. 22, 2016 (JP) ................................ 2016-031278

(51) Int. Cl.

| | | |
|---|---|---|
| C08L 9/00 | (2006.01) | |
| C08F 265/06 | (2006.01) | |
| C08G 18/66 | (2006.01) | |
| C08G 18/48 | (2006.01) | |
| C08G 18/76 | (2006.01) | |
| C08L 71/00 | (2006.01) | |
| C08L 75/08 | (2006.01) | |
| C08G 18/75 | (2006.01) | |
| C08L 63/00 | (2006.01) | |
| C08K 5/053 | (2006.01) | |
| C08L 51/00 | (2006.01) | |
| C08G 18/62 | (2006.01) | |
| C08L 13/00 | (2006.01) | |
| C08L 25/06 | (2006.01) | |
| C08L 63/10 | (2006.01) | |
| C08L 71/02 | (2006.01) | |
| C08G 101/00 | (2006.01) | |

(52) U.S. Cl.

CPC ........ *C08F 265/06* (2013.01); *C08G 18/4808* (2013.01); *C08G 18/4825* (2013.01); *C08G 18/4841* (2013.01); *C08G 18/4854* (2013.01); *C08G 18/6229* (2013.01); *C08G 18/6674* (2013.01); *C08G 18/6677* (2013.01); *C08G 18/755* (2013.01); *C08G 18/7621* (2013.01); *C08G 18/7664* (2013.01); *C08G 18/7671* (2013.01); *C08K 5/053* (2013.01); *C08L 9/00* (2013.01); *C08L 13/00* (2013.01); *C08L 25/06* (2013.01); *C08L 51/00* (2013.01); *C08L 63/00* (2013.01); *C08L 63/10* (2013.01); *C08L 71/00* (2013.01); *C08L 71/02* (2013.01); *C08L 75/08* (2013.01); *C08G 2101/0008* (2013.01); *C08G 2101/0083* (2013.01); *C08L 2207/53* (2013.01)

(58) Field of Classification Search

CPC ............ C08G 18/4808; C08G 18/4825; C08G 18/4841; C08G 18/4854; C08G 18/6674; C08G 18/755; C08L 9/00; C08L 13/00; C08L 25/06; C08L 63/00; C08L 51/00; C08L 71/00; C08F 265/06

USPC .......................................................... 523/201

See application file for complete search history.

(56) References Cited

U.S. PATENT DOCUMENTS

| | | | |
|---|---|---|---|
| 2003/0004217 A1 | 1/2003 | Kawamoto et al. | |
| 2003/0216486 A1 | 11/2003 | Kawamoto et al. | |
| 2009/0017311 A1* | 1/2009 | Kislig | C08G 18/12 |
| | | | 428/423.1 |
| 2013/0089731 A1 | 4/2013 | Imanaka et al. | |
| 2016/0122539 A1* | 5/2016 | Okamoto | C08J 5/04 |
| | | | 428/319.7 |
| 2016/0160092 A1* | 6/2016 | Awkal | C08J 5/128 |
| | | | 156/60 |
| 2018/0371238 A1 | 12/2018 | Okamoto | |
| 2019/0040182 A1* | 2/2019 | Miyatake | C08G 59/18 |

FOREIGN PATENT DOCUMENTS

| | | |
|---|---|---|
| EP | 3388487 A1 | 10/2018 |
| WO | 01/09242 A1 | 2/2001 |
| WO | 2009/014037 A1 | 1/2009 |
| WO | 2012002569 A1 | 1/2012 |

OTHER PUBLICATIONS

Anonymous, "Hildebrand solubility parameter—Wikipedia" Mar. 31, 2017 (4 pages).
Extended European Search Report issued in European Application No. 177563921, dated Sep. 12, 2019 (7 pages).

* cited by examiner

*Primary Examiner* — Hannah J Pak
(74) *Attorney, Agent, or Firm* — Osha Liang LLP

(57) ABSTRACT

A polyol composition includes a first polyol (A-I) having a number average molecular weight of 1000 to 10000; and 35 to 60% by weight of a core-shell polymer (B) including a core layer and a shell layer. The core-shell polymer is uniformly dispersed in the first polyol (A-I) and has a volume average particle diameter of 0.01 to 0.6 μm. A polymer constituting the shell layer has a solubility parameter of 9.30 to 10.20 $(cal/cm^3)^{1/2}$ and comprises at least 25 to 90% by weight of an alkyl (meth)acrylate unit having a linear or branched alkyl group of 4 to 10 carbons.

21 Claims, No Drawings

POLYOL COMPOSITION AND THERMOSETTING RESIN

TECHNICAL FIELD

One or more embodiments of the present invention relate to a polyol composition in which a core-shell polymer is dispersed in a polyol and a thermosetting resin containing the polyol composition.

BACKGROUND

In one or more embodiments, the polyol composition in which a core-shell polymer is dispersed in the polyol has been used for the improvement of mechanical properties (for example, toughness and tensile strength) of thermosetting resins such as polyurethane resins, epoxy resins, and polyester resins.

For example, Patent document 1 discloses that a polyol composition is obtained by polymerizing styrene, acrylonitrile, and an unsaturated ester having multiple double bonds in the polyol under the presence of a polymer dispersant having the reactivity, and that crosslinked polymer particles are dispersed in the polyol. In addition, Patent document 1 teaches that a polyurethane resin obtained by using the polyol composition has improved mechanical property.

On the other hand, Patent document 2 also describes a polyol composition in which a core-shell polymer is uniformly dispersed in a polyol, and a polyurethane resin and a polyester resin obtained by using the polyol composition.

PATENT DOCUMENT

Patent Document 1: WO01/009242
Patent Document 2: WO09/014037

However, in the techniques of Patent document 1, the polymer dispersant having the reactivity does not effectively exist on the surface of the polymer particles, and the mechanical property of the polyurethane resin is not improved sufficiently. In addition, Patent document 1 does not teach the combination of the core-shell polymer and the polyol.

On the other hand, Patent document 2 discloses that a hydroxyl group-containing monomer as an essential component is used for the polymerization of the shell layer of the core-shell polymer to improve the dispersibility of the core-shell polymer into the polyol. Patent document 2 also teaches that the polyol has a small molecular weight of 420. However, there is no disclosure that the core-shell polymer is dispersed in a large amount in a polyol having high molecular weight in Patent document 2. In addition, Patent document 2 does not teach that toughness and tensile strength are improved in the case where the polyol composition is applied to a resin. Further, the present inventors have found that a cured product formed by a composition corresponding to Patent document 2 has decreased toughness and tensile strength.

SUMMARY

Thus, one or more embodiments of the present invention provide a polyol composition in which a core-shell polymer is uniformly dispersed in a large amount in a polyol having a high molecular weight, and a thermosetting resin (for example, a polyurethane resin and an epoxy resin) containing the polyol composition and having excellent mechanical properties (for example, toughness and tensile strength).

A given core-shell polymer (B) may be uniformly dispersed in a large amount in a polyol (A-I) having a number average molecular weight of 1000 to 1000, by compounding a given polyol (A-I) and a core-shell polymer (B) having the shell layer polymerized with a given monomer in a given amount, and obtaining a thermosetting resin containing the polyol composition and having excellent mechanical properties (for example, toughness and tensile strength), to complete one or more embodiments of the present invention.

Specifically, the gist of one or more embodiments of the present invention are as follows.

1) One or more embodiments of the present invention contain a polyol composition containing a first polyol (A-I) having a number average molecular weight of 1000 to 10000 and a core-shell polymer (B) having a volume average particle diameter of 0.01 to 0.6 µm, wherein
  an amount of the core-shell polymer (B) is 35 to 60% by weight per 100% by weight of the polyol composition,
  the core-shell polymer (B) is uniformly dispersed in the first polyol (A-I),
  a polymer constituting a shell layer of the core-shell polymer (B) has a solubility parameter of 9.30 to 10.20 $(cal/cm^3)^{1/2}$, and
  the polymer constituting the shell layer is polymerized with at least 25 to 90% by weight of an alkyl (meth)acrylate having a linear or branched alkyl group of 4 to 10 carbons.
2) In the polyol composition of one or more embodiments of the present invention, the first polyol (A-I) is preferably a polyetherpolyol.
3) In the polyol composition of one or more embodiments of the present invention, the first polyol (A-I) is preferably at least one selected from polyoxypropylenediol, polyoxypropylenetriol, polyoxybutylenediol, and polyoxybutylenetriol.
4) In the polyol composition of one or more embodiments of the present invention, the core-shell polymer (B) preferably has at least one core layer selected from the group consisting of diene rubber, (meth)acrylate rubber, organosiloxane rubber, and styrene polymer.
5) In the polyol composition of one or more embodiments of the present invention, the polymer constituting the shell layer of the core-shell polymer (B) preferably has a glass transition temperature of −40° C. to 60° C.
6) In the polyol composition of one or more embodiments of the present invention, an amount of the core layer of the core-shell polymer (B) is preferably 70 to 95% by weight per 100% by weight of the core-shell polymer (B).
7) In the polyol composition of one or more embodiments of the present invention, the polymer constituting the shell layer is preferably further polymerized with 0 to 14% by weight of a hydroxyl group-containing (meth)acrylate.
8) One or more embodiments of the present invention also contains a polyurethane resin containing the polyol composition mentioned above, and a product obtained by reacting a second polyol (A-II) having a number average molecular weight of 100 to 10000 and a polyisocyanate (C).
9) One or more embodiments of the present invention also contains an epoxy resin composition containing the polyol composition mentioned above, an epoxy resin (D), and an epoxy resin curing agent (E).
10) One or more embodiments of the present invention further contains a cured product containing the epoxy resin composition mentioned above.

According to the polyol composition of one or more embodiments of the present invention, the core-shell polymer is uniformly dispersed in a large amount in a polyol having high molecular weight compared with conventional techniques, the thermosetting resins (for example, epoxy resin, and polyurethane resin) obtained by using the polyol composition have excellent mechanical properties (for example, toughness, and tensile strength).

DETAILED DESCRIPTION OF THE EMBODIMENTS

The polyol composition of one or more embodiments of the present invention contain a given polyol (A) and core-shell polymer (B) having a given volume average particle diameter, wherein the core-shell polymer (B) has a shell layer polymerized with a given amount of an alkyl(meth) acrylate having 4 to 10 carbons, the core-shell polymer (B) is contained in a given amount in the polyol composition, the core-shell polymer (B) is uniformly dispersed in the polyol (A).

In one or more embodiments, the core-shell polymer can be dispersed in a large amount in a polyol having a high molecular weight, and cured products formed by the polyol composition containing the core-shell polymer dispersed in the polyol have improved toughness and tensile strength compared with conventional cured products.

In one or more embodiments, the polyol (A) is classified into a first polyol (A-I) for dispersing a core-shell polymer, a second polyol (A-II) for the addition, or the like.

In addition, a polyol having a high molecular weight is defined as a polyol having a number average molecular weight of 1000 or more, and a polyol having a lower molecular weight is defined as a polyol having a number average molecular weight of less than 1000.

A polyol composition of one or more embodiments of the present invention contains a first polyol (A-I) having a number average molecular weight of 1000 to 10000 and a core-shell polymer (B) having a volume average particle diameter of 0.01 to 0.6 μm, wherein an amount of the core-shell polymer (B) is 35 to 60% by weight per 100% by weight of the polyol composition, the core-shell polymer (B) is uniformly dispersed in the first polyol (A-I), a polymer constituting a shell layer of the core-shell polymer (B) has a solubility parameter of 9.30 to 10.20 $(cal/cm^3)^{1/2}$, and the polymer constituting the shell layer is polymerized with at least 25 to 90% by weight of an alkyl (meth)acrylate having a linear or branched alkyl group of 4 to 10 carbons.

In one or more embodiments, a polyurethane resin containing the reaction product of the polyol composition, a second polyol (A-II) having a number average molecular weight of 100 to 10000, and a polyisocyanate (C) can maintain a state of which the core-shell polymer is uniformly dispersed, and can have excellent mechanical properties (for example, toughness, tensile strength). In addition, a cured product obtained by curing the epoxy resin composition containing the polyol composition, an epoxy resin (D), and an epoxy resin curing agent (E) can maintain a state of which the core-shell polymer is uniformly dispersed, and have excellent mechanical property (for example, toughness).

In one or more embodiments, the core-shell polymer (B) is uniformly dispersed in the polyol (A), the polyurethane resin, or the epoxy resin composition. When the core-shell polymer (B) is stably dispersed in the polyol at a uniform state, 1 g of the polyol composition is charged into 10 g of methylethylketone (MEK), a mixture is shaken fifty times, and still stood for 30 minutes, no aggregates and precipitates are produced to obtain a uniform dispersion. Even if thus obtained dispersion stands for 24 hours, the dispersion remains stable and no precipitates are produced. On the other hand, when the preparation of the uniform dispersion takes much time and aggregates and precipitates are produced, the core-shell polymer (B) and polyol (A) are incompatible, so that the dispersion stability of the core-shell polymer (B) into the polyol (A) becomes deteriorated. In addition, the dispersibility of the core-shell polymer into the polyurethane resin can be confirmed by frozing a molded product of the polyurethane resin with a liquid nitrogen, breaking the molded product, and observing a broken surface thereof with scanning electron microscopy.

One or more embodiments of the present invention are explained in detail as follows.
<Polyol (A)>

The polyol (A) used in one or more embodiments of the present invention is a compound having two or more hydroxyl groups in a molecule. The polyol (A) includes known polyols such as polyether polyol, polyester polyol, polycarbonate polyol, which are used as raw materials of polyurethane resin. A hydroxyl group of the polyol reacts with an isocyanate group of a polyisocyanate as set forth below to produce a polymer having a urethane bond, that is, a polyurethane resin. The polyol (A) may be used individually or in the combination of two or more polyols.

In one or more embodiments, concrete examples of the polyether polyol include a random or block copolymer and the like obtained by ring-opening polymerizing ethylene oxide, propylene oxide, butylene oxide, styrene oxide and the like under the presence of one or two or more active hydrogen-containing initiator (s), and a mixture thereof. The active hydrogen-containing initiator includes diols such as ethylene glycol, diethylene glycol, propylene glycol, dipropylene glycol, 1,3-butanediol, 1,4-butanediol, 1,6-hexanediol, neopentyl glycol, bisphenol A; triols such as trimethylol ethane, trimethylol propane, glycerin; sugars such as monosaccharide, oligosaccharide, polysaccharide; sorbitol; amines such as ammonia, ethylenediamine, urea, monomethyldiethanol amine, monoethyldiethanol amine.

In one or more embodiments, concrete examples of the polyester polyol include a polymer obtained by condensating polyprotic acids and anhydrides thereof such as maleic acid, fumaric acid, adipic acid, sebacic acid, phthalic acid, dodecanedioic acid, isophthalic acid, azelaic acid, with polyhydric alcohols such as ethylene glycol, propylene glycol, 1,4-butanediol, 1,6-hexanediol, diethylene glycol, dipropylene glycol, neopentyl glycol, 3-methyl-1,5-pentanediol under the presence of the esterification catalyst in the range of the temperature of 150 to 270° C.

In one or more embodiments, concrete examples of the polycarbonate polyol include a polymer obtained by condensating a reaction product of diols such as 1,4-butanediol, 1,6-hexanediol, neopentylglycol, 1,8-octanediol, 1,9-nonanediol, 1,4-cyclohexanedimethanol, 2-methylpropanediol, dipropyleneglycol, diethyleneglycol or these diols with dicarboxylic acids such as oxalic acid, malonic acid, succinic acid, adipic acid, azelaic acid, hexahydrophthalic acid, and aromatic carbonates or aliphatic carbonates such as diphenylcarbonate, bis(chlorophenyl)carbonate, dinaphthyl carbonate, phenyl toluyl carbonate, phenylchlorophenylcarbonate, 2-tolyl-4-tolylcarbonate, dimethylcarbonate, diethylcarbonate, diethylenecarbonate, ethylene carbonate, and a compound having two or more carbonate structures in a molecule such as those obtained by transesterification of alkylenecarbonate and alkyleneglycol.

In one or more embodiments, the polyol (A) is preferably a polyether polyol. The polyol (A) is particularly preferably at least one selected from polyoxypropylenepolyol such as polyoxypropylenediol and polyoxypropylenetriol, polyoxybutylenepolyol such as polyoxybutylenediol and polyoxybutylenetriol, and polycarbonatediol in the viewpoint of the ease of the handling and the mechanical properties. The polyoxypropylenepolyol may include those containing oxyethylene unit of less than 40% by weight in the polyoxypropylenepolyol such as polyoxypropylenepolyol-ethyleneoxide adduct in which an ethyleneoxide is added to a terminal of the polyoxypropylenepolyol. In addition, the polyoxybutylenediol may contain those containing oxy-3-methylbutylene unit of less than 40% by weight in the polyoxybutylenediol. The polyol is most preferably polyoxypropylenediol and polyoxypropylenetriol-ethyleneoxide adduct.

On the other hand, a multifunctional polyol of three or more functional groups having three or more hydroxyl groups per one molecule can be used with the two functional polyol in the case where the polyurethane resin is improved for modulus.

In one or more embodiments, the polyol (A) is classified into the first polyol (A-I) for dispersing the core-shell polymer and the second polyol (A-II) for addition to the polyol composition.

In one or more embodiments, the number average molecular weight of the first polyol (A-I) is 1000 to 10000, preferably 1000 to 8000, more preferably 1000 to 7500, and even preferably 1000 to 5000 based on polystyrene by GPC in the viewpoints of effects of improving toughness and tensile strength by the polyol and the suitability to a urethane elastomer. The first polyol (A-I) having a number average molecular weight of 1000 or more may be used individually or in the combination of two or more polyols.

In one or more embodiments, the number average molecular weight of the second polyol (A-II) is 100 to 10000, preferably 8000 or less, more preferably 7000 or less, and even preferably 5000 or less based on polystyrene by GPC in the viewpoints of the modification of the property of the polyurethane resin and the improvement of toughness and tensile strength.

In one or more embodiments, the second polyol (A-II) may be the same as the first polyol (A-I) or may be different from the first polyol (A-I). A mixture containing two or more polyols may be used. The second polyol can modify the polyurethane resin to flexible polyurethane resin, hard polyurethane resin, thermoplastic urethane elastomer, and the like.

In one or more embodiments, an amount of the first polyol (A-I) is preferably 70% by weight or more, more preferably 80% by weight or more, even preferably 90% by weight or more, and even more preferably 100% by weight per 100% by weight of the polyol (A).

In one or more embodiments, an amount of the first polyol (A-I) is preferably 40 to 65% by weight, more preferably 45 to 65% by weight, and even preferably 45 to 60% by weight per 100% by weight of the polyol composition in the viewpoints of the toughness and the tensile strength.

In one or more embodiments, an amount of the second polyol (A-II) is preferably 1 to 70% by weight, more preferably 2 to 65% by weight, and even preferably 5 to 60% by weight per 100% by weight of the polyurethane resin composition containing the polyol (A-I), the core-shell polymer (B), the polyisocyanate (C), the chain extender (E), and the crosslinking agent (G).

<Core-Shell Polymer (B)>

In one or more embodiments, the core-shell polymer (B) is uniformly dispersed in the polyol, and the polyurethane resin and the epoxy resin obtained by using the polyol composition containing dispersed core-shell polymer exhibit excellent mechanical properties (toughness and tensile strength).

In one or more embodiments, the core-shell polymer (B) is a polymer like particles containing at least two layer structure. Preferably, the core-shell polymer (B) is a polymer containing a core layer including a crosslinked polymer and a shell layer including a polymer graft-polymerized on the core layer.

In one or more embodiments, the core-shell polymer (B) has a volume average particle diameter of 0.01 to 0.6 μm, preferably 0.03 to 0.5 μm, and more preferably 0.05 to 0.4 μm. The core-shell polymer having such a volume average particle diameter is appropriately obtained by emulsion polymerization, while the core-shell polymer having too small volume average particle diameter and too large volume average particle diameter are hardly prepared economically and industrially. The volume average particle diameter of the core-shell polymer can be measured by using Microtrack UPA 150 (manufactured by Nikkiso Co., Ltd.).

In one or more embodiments, an amount of the core-shell polymer (B) is 35 to 60% by weight, preferably 35 to 55% by weight, more preferably 40 to 55% by weight, per 100% by weight of the polyol composition in the viewpoints of the improvement of toughness and tensile strength and the workability. When the amount of the core-shell polymer is too small, effects of improving properties using the core-shell polymer are reduced. In addition, when the amount of the core-shell polymer is too large, a viscosity of the polyol composition becomes too higher.

In one or more embodiments, the core-shell polymer (B) preferably has a component insoluble to MEK. The methyl ethyl ketone (MEK) insoluble content of the core-shell polymer (B) is preferably 95% by weight or more, more preferably 97% by weight or more, and particularly preferably 98% by weight or more. In the case where the MEK insoluble content is less than 95% by weight, the polyol composition tends to increase the viscosity and the handling of the composition becomes difficult.

A method for calculating MEK insoluble content of the core-shell polymer (B) is follows: the powder or film of the core-shell polymer is weighed, 2 g of the powder or film of the core-shell polymer is immersed in 100 g of methylethylketone (MEK) at 23° C. for 24 hours. Thus, obtained MEK insoluble content is collected to dry and weigh, and a weight ratio (%) to a weight of the core-shell polymer used in the measurement is calculated as a MEK insoluble content.

In one or more embodiments, the core layer preferably has a crosslinked polymer having the rubber property in the viewpoints of the balance between the tensile strength and elongation of the polyurethane resin, and the toughness of the epoxy resin. In order to exhibit the rubber property in the core layer, the core layer has a glass transition temperature of preferably 0° C. or less, more preferably −20° C. or less, and particularly preferably −40° C. or less. In the specification, the glass transition temperature is referred to as Tg in some case. Tg can be measured with dynamic viscoelastic measuring method or differential scanning calorimetry.

In one or more embodiments, a polymer capable of forming the core layer having the rubber property includes a natural rubber, a rubber polymer containing from 50 to 100% by weight of at least one monomer (first monomer) selected from a diene monomer (conjugated diene monomer) and (meth)acrylate monomer and from 0 to 50% by weight of other polymerizable vinyl monomer (second monomer), a polysiloxane rubber (organosiloxane rubber), or combination thereof.

In one or more embodiments, the core-shell polymer (B) preferably has at least one core layer selected from the group consisting of diene rubber, (meth)acrylate rubber, organosiloxane rubber, and styrene polymer. It is more preferable that the core layer has the diene rubber polymerized with the diene monomer in order to obtain the high mechanical property. The core layer more preferably has the (meth)acrylate rubber (acrylic rubber) in the case where the balance among the mechanical property, weather resistance, and economy is required. In the case where mechanical properties at lower temperature are improved, it is more preferable that the core layer has the polysiloxane rubber (organosiloxane rubber). In one or more embodiments of the present invention, (meth) acrylate means acrylate and/or methacrylate.

In one or more embodiments, a monomer (conjugated diene monomer) for constituting the diene rubber used in the core layer includes 1,3-butadiene, isoprene, 2-chrolo-1,3-butadiene, 2-methyl-1,3-butadiene and the like. These may be used individually or in combination of two or more monomers.

In one or more embodiments, a butadiene rubber polymerized with 1,3-butadiene, a butadiene-styrene rubber of a copolymer polymerized with 1,3-butadiene and styrene, or a butadiene-acrylate rubber of a copolymer polymerized with 1,3-butadiene and butylacrylate or 2-ethylhexylacrylate is preferable, and a butadiene rubber is more preferable. In addition, a butadiene-styrene rubber is more preferable in the view of improving the transparency of the polyurethane resin obtained from the adjustment of refractive index and improving the balance between the appearance and the mechanical properties. In addition, butadiene-acrylate rubber is preferable, because the weather resistance is improved by decreasing the content of butadiene having double bonds in the butadiene-acrylate rubber from the introduction of the acrylate.

In one or more embodiments, a monomer for constituting the (meth)acrylate rubber (acrylic rubber) used in the core layer includes alkyl (meth)acrylates such as methyl(meth)acrylate, ethyl(meth)acrylate, butyl(meth)acrylate, 2-ethylhexyl(meth)acrylate, octyl(meth)acrylate, dodecyl(meth)acrylate, stearyl(meth)acrylate, behenyl(meth)acrylate; aromatic ring containing (meth)acrylates such as phenoxyethyl(meth) acrylate, benzyl(meth)acrylate; hydroxyalkyl(meth)acrylates such as 2-hydroxyethyl(meth)acrylate, 4-hydroxybutyl(meth)acrylate; glycidyl (meth)acrylates such as glycidyl (meth) acrylate and glycidyl alkyl (meth) acrylate; alkoxyalkyl(meth)acrylates; allylalkyl (meth)acrylates such as allyl (meth)acrylate, and allylalkyl (meth) acrylate; multifunctional (meth)acrylates such as monoethylene glycol di(meth)acrylate, triethylene glycol di(meth)acrylate, tetraethylene glycol di(meth)acrylate and the like. These (meth)acrylate monomers may be used individually or in combination of two or more (meth)acrylate monomers. The monomer is preferably ethyl (meth)acrylate, butyl (meth)acrylate, and 2-ethylhexyl (meth)acrylate.

In one or more embodiments, a vinyl monomer (second monomer) polymerizable with the first monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene; a multifunctional monomer such as diallylphthalate, triallylcyanurate, triallylisocyanurate, divinylbenzene. These vinyl monomers may be used individually or in combination of two or more vinyl monomers. The monomer is especially preferably styrene.

In one or more embodiments, the polysiloxane rubber for constituting the core layer includes a polysiloxane polymer containing alkyl- or aryl-2-substituted silyloxy units such as dimethyl silyloxy, diethyl silyloxy, methylphenyl silyloxy, diphenyl silyloxy, dimethyl silyloxy-diphenyl silyloxy, or a polysiloxane polymer containing alkyl- or aryl-1-substituted silyloxy units such as a polysiloxane polymer having an organohydrogen silyloxy in which a part of alkyl in the side chain is substituted with hydrogen. The polysiloxane rubber may be used individually or in combination of two or more polymers. A combined rubber containing the polysiloxane rubber and (meth)acrylate rubber may be used. Among these, the polysiloxane rubber is preferably polysiloxane polymer having dimethyl silyloxy, methylphenyl silyloxy, or dimethylsilyloxy-butylacrylate in the viewpoints of giving the weather resistance and mechanical properties, and most preferably the polysiloxane polymer having dimethyl silyloxy, and dimethyl silyloxy-butylacrylate in the view of easy availability and the economy.

In one or more embodiments that the core layer is formed with the polysiloxane rubber, the polysiloxane rubber is contained in an amount of preferably not less than 10% by weight per 100% by weight of the core layer, so as not to impair the mechanical property at a lower temperature.

In one or more embodiments, the styrene polymer may be polymerized with styrene monomer as a main component and a multifunctional monomer as a crosslinking component.

In the core layer of one or more embodiments, it is preferable that a crosslinked structure is introduced in the polymer polymerized with the above monomer(s) and the polysiloxane polymer in the view of retaining the dispersion stability of the core-shell polymer (B) in the polyol composition, the polyurethane resin, and the epoxy resin. As methods for introducing the crosslinked structure, a conventional method can be used. A method for introducing the crosslinked structure to the polymer polymerized with the above monomer(s) includes a method for adding to a monomer for forming a polymer a crosslinking monomer such as a multifunctional monomer and a mercapto group-containing compound and the like, and polymerizing these. In addition, a method for introducing the crosslinked structure to the polysiloxane polymer includes a method for combining partly a multifunctional alkoxysilane compound at polymerization, a method for introducing a reactive group such as a vinyl reactive group, a mercapto group, a methacryloyl group and the like to the polysiloxane polymer, and adding a polymerizable vinyl monomer or organic peroxide to subjecting to radical reaction, and a method for adding a crosslinking monomer such as a multifunctional monomer and a mercapto group-containing compound to the polysiloxane polymer and polymerizing these.

In one or more embodiments, the multifunctional monomer does not contain butadiene, and includes allylalkyl (meth)acrylates such as allyl(meth)acrylate, allylalkyl(meth)acrylate; allyloxyalkyl(meth)acrylates; multifunctional (meth)acrylates having two or more (meth)acrylic groups such as (poly)ethylene glycol di(meth)acrylate, butanediol di(meth)acrylate, ethylene glycol di(meth)acrylate, triethylene glycol di(meth)acrylate, tetraethylene glycol di(meth)acrylate; diallyl phthalate, triallylcyanurate, triallylisocyanurate, divinylbenzene and the like. Allylmethacrylate, triallyl isocyanurate, butanediol di(meth)acrylate, and divinyl benzene are particularly preferable.

In one or more embodiments, the core layer has a glass transition temperature of preferably more than 0° C., more preferably 20° C. or more, even preferably 50° C. or more, particularly preferably 80° C. or more, and most preferably 120° C. or more in the case where the balance between the strength and the elastic modulus of the thermosetting resin such as the polyurethane resin and the epoxy resin is required.

In one or more embodiments, a polymer for forming the core layer in which Tg is greater than 0° C. and the modulus of the thermosetting resin can be improved includes a polymer composed of 50 to 100% by weight (preferably 65 to 99% by weight) of at least one kind of a monomer having Tg greater than 0° C. in homopolymer and 0 to 50% by weight (preferably 1 to 35% by weight) of at least one kind of a monomer having Tg less than 0° C. in homopolymer.

In one or more embodiments, when Tg of the core layer is greater than 0° C., it is preferable that the crosslinked structure is introduced in the core layer. Tg increases by the introduction of the crosslinked structure. The method of introducing the crosslinked structure includes the method mentioned above.

A monomer having Tg greater than 0° C. in the homopolymer includes those containing the following one or more monomers, but is not particularly limited. The monomer includes an unsubstituted aromatic vinyl compound such as styrene, 2-vinylnaphthalene; a substituted aromatic vinyl compound such as α-methyl styrene; an alkyl-substituted aromatic vinyl compound such as 3-methylstyrene, 4-methylstyrene, 2,4-dimethylstyrene, 2,5-dimethylstyrene, 3,5-dimethylstyrene, 2,4,6-trimethylstyrene; an alkoxy-substituted aromatic vinyl compound such as 4-methoxystyrene, 4-ethoxystyrene; a halogenated aromatic vinyl compound such as 2-chlorostyrene, 3-chlorostyrene; an ester-substituted aromatic vinyl compound such as 4-acetoxystyrene; a hydroxyl-substituted aromatic vinyl compound such as 4-hydroxystyrene; a vinyl ester such as vinyl benzoate, vinylcyclohexanoate; a halogenated vinyl compound such as vinylchloro; an aromatic ring-containing heterocyclic monomer such as acenaphthalene, indene; an alkylmethacrylate such as methylmethacrylate, ethylmethacrylate, isopropylmethacrylate; an aromatic methacrylate such as phenylmethacrylate; an alicyclic methacrylate such as isobornyl methacrylate; alkylsilylmethacrylate such as trimethylsilylmethacrylate; a methacrylic monomer containing methacrylic acid derivative such as methacrylonitrile; an alicyclic acrylate such as isobornyl acrylate, an acrylic acid ester such as branched alkylacrylate such as tert-butylacrylate; an acrylic monomer containing acrylic acid derivative such as acrylonitrile. Further, the monomer includes a monomer having Tg greater than 120° C. such as acrylamide, isopropylacrylamide, N-vinylpyrrolidone, dicyclopentanylmethacrylate, 2-methyl-2-adamantylmethacrylate, 1-adamantylacrylate and 1-adamantylmethacrylate.

In one or more embodiments of the present invention, the core layer may be composed of monolayer in some cases, and may be composed of multilayers. In the case where the core layer is composed of multilayer, the polymer composition of each layer may be different each other.

In one or more embodiments, the core layer may be a core layer of two layers having a second layer polymerized with a different polymer composition on the surface of the first core layer, and a core layer of three layers having a third layer polymerized with a different polymer composition on the surface of the core layer having two layers. When the second core layer of the outermost layer in the core layer having two layer and the third core layer of the outermost layer in the core layer having three layers are a polymer obtained by polymerizing as a main component a multifunctional monomer such as triallylisocyanurate, there is a merit that a shell polymer as set forth below is easily grafted-polymerized. On the contrary, there is a demerit that the manufacture of the core layer having a multilayer structure becomes complicated.

In one or more embodiments, an amount of the core layer of the core-shell polymer (B) is preferably from 70 to 95% by weight, more preferably from 80 to 93% by weight, and even preferably 80 to 90% by weight, per 100% by weight of the core-shell polymer in the viewpoint of the mechanical properties. In the case where the amount of the core layer is smaller, the viscosity of the polyol composition trends to increase. In the case where the amount of the core layer is much large, it is difficult to prepare the core-shell polymer and to collect the core-shell polymer from a solution after reaction in the practical form even if the core-shell polymer can be synthesized. The amount of the core layer of the core-shell polymer can be measured with absorbance ratio in spectrum from infrared spectroscopy.

In one or more embodiments, the shell layer or the shell polymer existing at outermost of the core-shell polymer (B) controls the compatibility between the core-shell polymer (B) and the polyol (A) and effectively makes the core-shell polymer dispersed in the polyol.

In one or more embodiments, the shell polymer is preferably grafted on the core polymer of the core layer. More precisely, it is preferable that a monomer used in the formation of the shell layer is graft-polymerized on the core polymer for forming the core layer, and the shell polymer is chemically bonded to the rubber core polymer. It is preferable that the shell polymer is formed by graft-polymerizing the monomer for forming the shell layer under the presence of the core polymer, and a part or all of the core polymer is covered with the shell polymer. Such a polymerization can be carried out by adding a monomer for constituting the shell polymer to a latex containing the core polymer prepared in the state of an aqueous latex, and polymerizing the monomer and the core polymer.

In one or more embodiments, the monomer for forming the shell layer is selected so that the polymer constituting the shell layer has a solubility parameter (SP value) of from 9.30 to 10.20 $(cal/cm^3)^{1/2}$ and preferably from 9.35 to 10.10 $(cal/cm^3)^{1/2}$. When the solubility parameter is out of the above range, the viscosity of the polyol composition tends to increase.

The solubility parameter is a value calculated by the method of Fedors described in Polymer Engineering and Science, vol. 14, 1974, pp. 147-154. The solubility parameter is, for example, 9.93 $(cal/cm^3)^{1/2}$ for polymethyl methacrylate, 9.77 $(cal/cm^3)^{1/2}$ for polybutyl acrylate, 12.99 $(cal/cm^3)^{1/2}$ for poly(4-hydroxybutyl acrylate), 10.32 $(cal/cm^3)^{1/2}$ for polystyrene, 11.21 $(cal/cm^3)^{1/2}$ for polyacrylonitrile, 9.22 $(cal/cm^3)^{1/2}$ for poly(2-ethylhexyl acrylate), 10.42 $(cal/cm^3)^{1/2}$ for polyallyl methacrylate, and 11.45 $(cal/cm^3)^{1/2}$ for polyglycidyl methacrylate.

The solubility parameter $SP_c$ of the copolymer is calculated from the weight average of the solubility parameter of the homopolymer. That is, it is calculated from the solubility parameter $SP_n$ of a homopolymer of each monomer constituting the copolymer composed of m kinds of monomers and the weight $W_n$ of each monomer using the following equation (1).

[Equation 1]

$$SP_c = \sum_{n=1}^{n=m}(SP_n * W_n) \bigg/ \sum_{n=1}^{n=m} W_n \quad (1)$$

For example, the solubility parameter of a copolymer composed of 50 g of styrene and 50 g of methyl methacrylate is calculated by substituting a solubility parameter of polystyrene of 10.32 $(cal/cm^3)^{1/2}$ and a solubility parameter of polymethyl methacrylate of 9.93 $(cal/cm^3)^{1/2}$ into the equation (2), and the obtained value is 10.13 $(cal/cm^3)^{1/2}$.

Further, in one or more embodiments, from the viewpoint of reducing the viscosity of the polyol composition and having good mechanical characteristics (e.g., toughness and tensile strength) of the thermosetting resin, the monomer for forming the shell layer is selected so that the polymer constituting the shell layer of the core-shell polymer (B) has a glass transition temperature (also referred to as Tg) of preferably −40 to 60° C., more preferably −35 to 50° C., and even preferably −30 to 40° C.

The Tg of the polymer obtained from the selected monomer can be obtained from handbooks and technical data obtained from suppliers of various monomers. A relatively large amount of data is described in pages 52-53 of Aldrich Reference (provided by Aldrich: Polymer Properties). In the present specification, the Tg of polyacrylonitrile is 85° C. (358 K), the Tg of polyallyl methacrylate is 52° C. (325 K) based on technical data of BASF SE, the Tg of poly(4-hydroxyl butyl acrylate) is −40° C. (233 K) based on technical data of Nippon Kasei CO., LTD., and the Tg of polyglycidyl methacrylate is 46° C. (319 K) based on technical data of SANESTERS CORPORATION. The Tg of the copolymer can be calculated using the Tg of the homopolymer. Specifically, it is calculated by Fox's equation described in "ENCYCLOPEDIA OF POLYMER SCIENCE AND ENGINEERING" published by John Wiley & Son Company, vol. 7, 1987, page 539. That is, the $Tg_c$ of the copolymer is calculated from the glass transition temperature $Tg_n$ of a homopolymer of each monomer constituting the copolymer composed of m kinds of monomers and the weight fraction $Wf_n$ (value of % by weight/100) of each monomer using the following equation (2). In this equation, the absolute temperature (K) is used as the unit of Tg, and thus it is converted to the Celsius temperature (° C.) by subtracting 273 from the obtained absolute temperature value.

[Equation 2]

$$1/Tg_c = \sum_{n=1}^{n=m}(Wf_n/Tg_n) \quad (2)$$

For example, the Tg of a copolymer composed of 50% by weight of styrene, 25% by weight of methyl methacrylate, and 25% by weight of butyl acrylate is determined by substituting a Tg of polystyrene of 373 K (100° C.), a Tg of polymethyl methacrylate of 378 K (105° C.), and a Tg of polybutyl acrylate of 219 K (−54° C.) into the equation (2), and a value of 45° C. (318 K) is obtained.

In one or more embodiments of the present invention, the monomer forming the shell layer preferably contains a monomer satisfying either or both of the SP value and the glass transition temperature as mentioned above, and more preferably contains a monomer satisfying both the SP value and the glass transition temperature as mentioned above.

That is, the monomer forming the shell layer preferably contains a monomer having a solubility parameter of 9.30 to 10.20 $(cal/cm^3)^{1/2}$ and a glass transition temperature of −40 to 60° C., more preferably contains a monomer having a solubility parameter of 9.30 to 10.20 $(cal/cm^3)^{1/2}$ and a glass transition temperature of −35 to 50° C., and even preferably contains a monomer having a solubility parameter of 9.30 to 10.10 $(cal/cm^3)^{1/2}$ and a glass transition temperature of −30 to 40° C.

In one or more embodiments, the monomer for forming the shell layer is preferably a (meth)acrylate monomer, and an aromatic vinyl monomer in the viewpoint of easily controlling Tg of the shell layer.

In one or more embodiments, the monomer for forming the shell layer may contain a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group in order to uniformly disperse the core-shell polymer (B) in the thermosetting resin.

In one or more embodiments, the monomer for forming the shell layer may contain a hydroxyl group-containing vinyl monomer in order to disperse the core-shell polymer in the polyurethane resin and the epoxy resin. The hydroxyl group-containing vinyl monomer can control a variation of the dispersion state of the core-shell polymer because the monomer joins in the synthesis of the polyurethane resin from the reaction of the polyol composition, the second polyol, and the polyisocyanate (C) to form a chemical bond.

In addition, the monomer for forming the shell layer may contain an epoxy group-containing vinyl monomer because the uniform dispersion state remains stable in the cured product of the epoxy resin.

In one or more embodiments, the vinyl monomer containing a hydroxyl group or an epoxy group is contained in an amount of preferably 0 to 20% by weight, more preferably 0 to 14% by weight, and 0.5 to 10% by weight per 100% by weight of the monomer for forming the shell layer. That is, a polymer constituting the shell layer is polymerized with preferably 0 to 20% by weight, more preferably 0 to 14% by weight, and even preferably 0.5 to 10% by weight of a hydroxyl group or an epoxy group-containing (meth) acrylate in the viewpoints of toughness and tensile strength. When the amount of the vinyl monomer containing a hydroxyl group or an epoxy group is too large in the monomer for forming the shell layer, the dispersibility of the core-shell polymer trends to decrease in the polyol composition.

In addition, when a multifunctional monomer having two or more double bonds is used as a monomer for forming the shell layer, the cross-linked structure is introduced in the shell layer. Thus, a multifunctional monomer having two or more double bonds is preferably used as a monomer for forming the shell layer because a viscosity of the polyol composition can be decreased due to the decreased interaction of the core-shell polymer (B) and the polyol (A). On the other hand, when an elongation of the polyurethane resin trends to decrease and is improved at maximum, it is preferable that a multifunctional monomer having two or more double bonds is not used as a monomer for forming the shell layer.

In one or more embodiments, the multifunctional monomer is contained in an amount of preferably from 0.5 to 10% by weight, and more preferably from 1 to 5% by weight, per 100% by weight of a monomer for forming the shell layer.

Concrete examples of the (meth)acrylate monomer include linear (meth)acrylates such as methyl(meth)acrylate, ethyl(meth)acrylate, propyl(meth)acrylate, butyl(meth)acrylate, octyl(meth)acrylate, undecyl(meth)acrylate, dodecyl (meth)acrylate; branched (meth)acrylates such as 2-methoxyethyl(meth)acrylate, 2-ethylhexyl(meth)acrylate.

In one or more embodiments, the alkyl (meth)acrylate having a linear or branched alkyl group of 4 to 10 carbons includes linear alkyl (meth)acrylates having 4 to 10 carbons (preferably 4 to 8 carbons, more preferably 4 to 6 carbons) such as n-butyl(meth)acrylate, pentyl(meth)acrylate, hexyl (meth)acrylate, heptyl(meth)acrylate, octyl(meth)acrylate, nonyl(meth)acrylate, decyl(meth)acrylate; branched alkyl (meth)acrylates having 4 to 10 carbons (preferably 6 to 10 carbons, more preferably 8 to 10 carbons) such as isobutyl (meth)acrylate, s-butyl(meth)acrylate, t-butyl(meth)acrylate, isopentyl(meth)acrylate, 2-ethylhexyl(meth)acrylate, isooctyl(meth)acrylate, isononyl(meth)acrylate, and isodecyl(meth)acrylate.

Among these, n-butyl(meth)acrylate, 2-ethylhexyl(meth)acrylate are particularly preferable, and n-butylacrylate, n-butylmethacrylate, 2-ethylhexylacrylate are most preferable.

In one or more embodiments, the polymers that constitute the shell layer contain 25 to 90% by weight, and particularly preferably 28 to 87% by weight of the alkyl (meth)acrylate having a linear or branched alkyl group of 4 to 10 carbons in the viewpoint of the decreased viscosity of the polyol composition.

Among the above alkyl (meth)acrylate, the alkyl (meth)acrylate having a linear or branched alkyl group of 1 to 3 carbons is preferably methyl(meth)acrylate, ethyl(meth)acrylate, isopropyl(meth)acrylate, and more preferably methylmethacrylate.

In one or more embodiments, concrete examples of the aromatic vinyl monomer include styrene, α-methyl styrene, p-methyl styrene, divinyl benzene and the like.

In one or more embodiments, concrete examples of the vinyl monomer containing a hydroxyl group include 2-hydroxyethyl (meth)acrylate, 4-hydroxybutyl (meth)acrylate, and the like.

In one or more embodiments, concrete examples of the vinyl monomer containing an epoxy group include glycidyl (meth) acrylate, 4-hydroxy butyl(meth)acrylate glycidyl ether, allyl glycidyl ether, and the like. Particularly, glycidyl methacrylate is preferable in the view of the stability and the reactivity.

In one or more embodiments, concrete examples of the multifunctional monomer having two or more double bonds are exemplified by the same monomer as the above-mentioned multifunctional monomer. The multifunctional monomer is preferably allylmethacrylate, and triallylisocyanurate.

In one or more embodiments, the monomers for forming the shell layer are composed of preferably 25 to 90% by weight of the alkyl (meth)acrylate having a linear or branched alkyl group of 4 to 10 carbons, 10 to 75% by weight of the alkyl (meth)acrylate having a linear or branched alkyl group of 1 to 3 carbons, 0 to 20% by weight (more preferably 1 to 14% by weight) of a hydroxyl group-containing (meth)acrylate, and 0 to 20% by weight (more preferably 1 to 14% by weight) of an epoxy group-containing (meth)acrylate, per 100% by weight of the monomers for forming the shell layer. In addition, the monomers for forming the shell layer are composed of preferably 25 to 90% by weight of the alkyl (meth)acrylate having a linear or branched alkyl group of 4 to 10 carbons, 10 to 75% by weight of the alkyl (meth)acrylate having a linear or branched alkyl group of 1 to 3 carbons, and 1 to 14% by weight of a hydroxyl group-containing (meth)acrylate, per 100% by weight of the monomers for forming the shell layer.

In one or more embodiments, the shell layer more preferably contains a polymer polymerized with 100% by weight of the monomers for forming the shell layer containing 25 to 90% by weight of butyl acrylate, 20 to 70% by weight of methylmethacrylate, 1 to 20% by weight of 4-hydroxybutylacrylate, 0 to 20% by weight of glycidyl (meth)acrylate. By these monomers, the polyol composition has a decreased viscosity, and cured products obtained from the polyurethane resin and the epoxy resin have excellent mechanical property.

In one or more embodiments, the shell layer may be formed with other monomer in addition to the above monomers. In one or more embodiments, an amount of the shell layer of the core-shell polymer (B) is preferably from 5 to 30% by weight, and more preferably from 7 to 20% by weight, per 100% by weight of the core-shell polymer. In the case where the amount of the shell layer is too large, there is a tendency to greatly increase a viscosity of the polyol composition. In addition, when the amount of the shell layer is too small, the dispersion of the core-shell polymer into the polyol becomes difficult.

<Method for Preparing Core-Shell Polymer (B)>
(Method for Preparing Core Layer)

In the embodiments where the polymer for forming the core layer as the constituent of the core-shell polymer (B) used in one or more embodiments of the present invention contains at least one monomer (first monomer) selected from the diene monomer (conjugated diene monomer) and (meth)acrylate monomer, the core layer can be prepared according to emulsion polymerization, suspension polymerization, micro-suspension polymerization and the like, and methods described in WO2005/028546 can be used.

In the embodiments where the polymer for forming the core layer contains the polysiloxane polymer, the core layer can be prepared by emulsion polymerization, suspension polymerization, micro-suspension polymerization and the like, and methods described in EP1338625 can be used.

(Method for Preparing Shell Layer)

In one or more embodiments, the shell layer can be formed by polymerizing a monomer for forming the shell layer with a known radical polymerization. In the case where a core-shell polymer precursor constituting the core layer is obtained as an emulsion, it is preferable that the polymerization of the monomer for forming the shell layer is carried out with the emulsion polymerization, and the shell layer can be prepared according to methods of WO 2005/028546.

In one or more embodiments, the following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfuric acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used individually, or two or more of these may be used in combination.

In one or more embodiments, the amount of the emulsifier (dispersant) is preferably as small as possible, but the dispersion stability of the core-shell polymer in the aqueous latex should be secured. The emulsifier (dispersant) preferably has as high water solubility as possible. An emulsifier (dispersant) having high water solubility can be easily washed out with water, and thus its bad influence on the final cured product can be easily avoided.

As known initiators of emulsion-polymerization, thermal decomposition initiators such as 2,2'-azobisisobutylonitrile, organic peroxide, hydrogen peroxide, potassium persulphate, ammonium persulfate can be used. In one or more embodiments of the present invention, the organic peroxide is particularly preferable.

In one or more embodiments, the preferred organic peroxides include t-butylperoxy isopropyl carbonate, p-menthane hydroperoxide, cumene hydroperoxide, dicumyl peroxide, t-butyl hydroperoxide, di-t-butyl peroxide, di-t-hexyl peroxide, and the like. Among these, the organic peroxides preferably have a 10 hr half-life temperature of 120° C. or more, and a 10 hr half-life temperature is referred to as $T_{10}$. The organic peroxides having a 10 hr half-life temperature of 120° C. or more is preferably di-t-butyl peroxide having $T_{10}$ of 124° C., p-menthane hydroperoxide having $T_{10}$ of 128° C., cumene hydroperoxide having $T_{10}$ of 158° C., and t-butyl hydroperoxide having $T_{10}$ of 167° C. in the view of high MEK insoluble content of the core-shell polymer (B).

In addition, redox type initiators of organic peroxides in combination with reducing agents such as sodium formaldehyde sulfoxylate, glucose as needed and transition metal salts such as ferrous sulfate as needed, chelating agents such as disodium ethylenediaminetetraacetate as needed, further phosphorus-containing compounds such as sodium pyrophosphate as needed can also be used.

In one or more embodiments where polymerization is carried out using a redox type initiator, it is possible to carry out the polymerization even at a low temperature at which the peroxide does not cause substantially thermal decomposition and to set the polymerization temperature in a wide range, and therefore such a polymerization is preferable. The amount of the initiator or the amount of the reducing agent/transition metal salt/chelating agent when a redox-type initiator is used can be used in the range known in the art.

Also, a known chain transfer agent can be used. The chain transfer agent may be those used in the conventional emulsion polymerization, and is not particularly limited.

Concrete examples of the chain transfer agent include t-dodecyl mercaptan, n-octylmercaptan, n-tetradecylmercaptan, n-hexylmercaptan, and the like. The conditions to be applied in the polymerization, such as polymerization temperature, pressure, and deoxidation, are those known in the art.

<Polyol Composition>

In the polyol composition of one or more embodiments of the present invention, given core-shell polymer (B) is dispersed in the polyol (A-I) at a uniform state. Various methods can be used as a method of obtaining a polyol composition in which a core-shell polymer (B) is dispersed in the polyol (A-I) at a uniform state. For example, such a method includes a method of bringing a core-shell polymer (B) obtained in the state of an aqueous latex, into contact with the polyol (A-I) and then removing unnecessary components such as water and the like, and a method of once extracting a core-shell polymer (B) with an organic solvent and then mixing the extract with the polyol (A-I) to remove the organic solvent. However, it is preferred to use the method described in International Publication WO 2009/14037. Specifically, such a method includes a first step of mixing an aqueous latex containing a core-shell polymer (B) (in particular, a reaction mixture after production of the core-shell polymer (B) by emulsion polymerization) with an organic solvent having a solubility of 5% by mass or more and 40% by mass or less in water at 20° C. and further mixing the mixture with an excess of water to agglomerate the core-shell polymer (B); a second step of separating and collecting the agglomerated core-shell polymer (B) from the liquid phase and mixing the core-shell polymer with an organic solvent again to obtain an organic solvent solution containing the core-shell polymer (B); and a third step of further mixing the organic solvent solution with the polyol (A-I) and then distilling off the organic solvent, and this method is preferably used for the preparation of the composition.

In one or more embodiments, a total amount of the polyol (A-I) and the core-shell polymer (B) is preferably 80% by weight or more, more preferably 90% by weight or more, even preferably 95% by weight or more, and particularly preferably 100% by weight per 100% by weight of the polyol composition.

<Polyisocyanate (C)>

The polyisocyanate (C) of one or more embodiments of the present invention is an essential component for forming a polyurethane resin by reacting with the polyol (A-I) and polyol (A-II) of one or more embodiments of the present invention. The polyisocyanate (C) may be used individually or in combination of two or more polyisocyanates. Conventionally known polyisocyanate compounds are used as the polyisocyanate (C). Conventionally known polyisocyanate compounds include diisocyanate compounds and polyisocyanate compounds other than diisocynate compounds. The diisocyanate compounds include, for example, an aliphatic diisocyanate compound, an alicyclic diisocyanate compound, an aromatic and aliphatic diisocyanate compound, an aromatic diisocyanate compound and the like. The concrete examples of these are exemplified below.

The aliphatic diisocyanate compound includes trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanate methyl caproate, and the like.

The alicyclic diisocyanate compound includes 1,3-cyclopentene diisocyanate, 1,4-cyclohexane diisocyanate, 1,3-cyclohexane diisocyanate, 3-isocyanate methyl-3,5,5-trimethylcyclohexylisocyanate, 4,4'-methylenebis(cyclohexylisocyanate), methyl-2,4-cyclohexane diisocyanate, methyl-2,6-cyclohexane diisocyanate, 1,3-bis(isocyanatemethyl)cyclohexane, 1,4-bis(isocyanatemethyl)cyclohexane, isophorone diisocyanate and the like.

The aromatic and aliphatic diisocyanate compound includes 1,3- or 1,4-xylylendiisocyanate or a mixture thereof, ω,ω'-diisocyanate-1,4-diethyl benzene, 1,3- or 1,4-bis (1-isocyanate-1-methylethyl)benzene or a mixture thereof, and the like.

The aromatic diisocyanate compound includes m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate, and the like.

The polyisocyanate compound other than diisocyanate compound includes an aliphatic polyisocyanate compound, an alicyclic polyisocyanate compound, an aromatic and aliphatic polyisocyanate compound, an aromatic polyisocyanate compound, and the like. The concrete examples of these are exemplified below.

The aliphatic polyisocyanate compound includes lysine triisocyanate, 1,4,8-triisocyanate octane, 1,6,11-triisocyanate undecane, 1,8-diisocyanate-4-isocyanate methyl octane, 1,3,6-triisocyanate hexane, 2,5,7-trimethyl-1,8-diisocyanate-5-isocyanate methyl octane and the like.

The alicyclic polyisocyanate compound includes 1,3,5-triisocyanatecyclohexane, 1,3,5-trimethylisocyanatecyclohexane, 3-isocyanate methyl-3,3,5-trimethylcyclohexylisocyanate, 2-(3-isocyanatepropyl)-2,5-di(isocyanatemethyl)-bicyclo[2.2.1]heptane, 2-(3-isocyanatepropyl)-2,6-di(isocyanatemethyl)-bicyclo[2.2.1]heptane, 3-(3-isocyanatepropyl)-2,5-di(isocyanatemethyl)-bicyclo[2.2.1]heptane, 5-(2-isocyanateethyl)-2-isocyanate methyl-3-(3-isocyanatepropyl)-bicyclo[2.2.1]heptane, 6-(2-isocyanateethyl)-2-isocyanatemethyl-3-(3-isocyanatepropyl)-bicyclo[2.2.1]heptane, 5-(2-isocyanateethyl)-2-isocyanatemethyl-2-(3-isocyanatepropyl)-bicyclo[2.2.1]heptane, 6-(2-isocyanateethyl)-2-isocyanatemethyl-2-(3-isocyanatepropyl)-bicyclo[2.2.1]heptane and the like.

The aliphatic and aromatic polyisocyanate compound includes 1,3,5-triisocyanate methyl benzene and the like.

The aromatic polyisocyanate compound includes triphenylmethane-4,4',4''-triisocyanate, 1,3,5-triisocyanate benzene, 2,4,6-triisocyanatetolune, 4,4'-diphenylmethane-2,2',5,5'-tetraisocyanate, polymethylene polyphenyl polyisocyanate and the like.

Further, the polyisocyanate compound includes an allophanate-modified product, a biuret modified product, an isocyanurate modified product and the like, which is obtained by using various polyisocyanates as mentioned above.

In one or more embodiments, the aromatic diisocyanate compound and the alicyclic diisocyanate compound are preferable to obtain a thermoplastic urethane elastomer excellent in mechanical properties. Especially, 4,4'-diphenyl methane diisocyanate, 2,4- or 2,6-tolylene diisocyanate, 4,4'-methylenebis (cyclohexylisocyanate), polymethylene polyphenyl polyisocyanate, and 3-isocyanate methyl-3,5,5-trimethylcyclohexylisocyanate are preferable.

<Polyurethane Resin>

The polyurethane resin of one or more embodiments of the present invention is mainly a reaction product of the polyol composition, the second polyol (A-II) having a number average molecular weight of 100 to 10,000, and the polyisocyanate (C). In addition to these components, a crosslinking agent, a chain extender, and the like may be mixed with the reaction system to obtain the polyurethane resin. The polyol composition used herein includes a composition obtained by additionally mixing the polyol (A-I) or the polyol (A-II) with the polyol composition. Further, the polyurethane resin used herein includes resins ranging from rigid polyurethane to flexible polyurethane.

More specifically, the "one-shot method" and "prepolymer method" known in the industry can be used to prepare the polyurethane resin. The reaction can be accelerated by using a catalyst in either case.

In one or more embodiments, the one-shot method is a method of collectively mixing the polyol composition, the polyol (A-II), and the polyisocyanate (C) and, if necessary, the chain extender or crosslinking agent to be described later, and reacting the mixture to obtain a polyurethane resin.

In one or more embodiments, the amount of the polyisocyanate (C) to be used is determined according to the active hydrogen equivalents of the polyol composition and the polyol (A-II) and the active hydrogen equivalents of the chain extender and the crosslinking agent. That is, the amount of the polyisocyanate (C) to be used is determined so that the equivalent ratio between the isocyanate equivalent of the polyisocyanate (C) and the active hydrogen equivalent of the total of the polyol composition, the polyol (A-II), the chain extender, and the crosslinking agent is, for example, from 0.80 to 3.00, preferably from 0.90 to 2.00, and more preferably from 0.95 to 1.50 based on the isocyanate equivalent/active hydrogen equivalent. When the amount of the polyisocyanate (C) is too small or too large, the urethane formation reaction becomes insufficient.

In one or more embodiments, the synthesis of the polyurethane resin by the one-shot method may be a conventionally known method. For example, the polyol composition, the polyol (A-II), if necessary, a chain extender, and a crosslinking agent are charged into a closed-type reaction kettle equipped with a stirrer, a condenser, a vacuum dehydrator, and a nitrogen gas flow device, and the inside of the kettle was dehydrated under reduced pressure. The polyisocyanate (C) is added thereto and reacted at 50 to 150° C. for 0.5 to 10 hours in a dry nitrogen stream.

On the other hand, the prepolymer method is a method involving two or more reaction steps. First, the polyol composition, the polyol (A-II), and the excessive amount of the polyisocyanate (C) are reacted in advance to obtain a polymer having an isocyanate group at the polymer terminal (also referred to as prepolymer). When the amount of the polyisocyanate (C) is excessively large, a mixture in which the prepolymer and the surplus polyisocyanate (C) coexist is obtained. In one or more embodiments of the present invention, this mixture is also treated as the prepolymer. Subsequently, a different type of polyol (A-II) and/or a chain extender or a crosslinking agent are added thereto and the mixture is reacted with the prepolymer. As a reference method for prepolymerization, there is a method described in NIPPON GOMU KYOKAISHI, the Journal of our Society, issued in 1995, vol. 68, page 417.

In one or more embodiments of the prepolymer method, the reaction is performed so that the equivalent ratio between the isocyanate equivalent of the polyisocyanate (C) and the active hydrogen equivalent of the polyol composition (including polyol (A-II)) is 1.5 to 10 based on the isocyanate equivalent/active hydrogen equivalent. Subsequently, a polyol (A-II) and/or a chain extender or a crosslinking agent is added to the obtained prepolymer and the mixture is reacted to obtain a polyurethane resin. The active hydrogen is derived from a functional group such as a hydroxyl group or an amino group. The equivalent ratio between the isocyanate equivalent of the polyisocyanate (C) for obtaining the polyurethane resin and the active hydrogen equivalent of the total of the polyol composition used for obtaining the prepolymer, the polyol (A-II) additionally used, the chain extender, and the crosslinking agent is determined so as to be preferably from 0.80 to 3.00, more preferably from 0.90 to 2.00, and even preferably from 0.95 to 1.50. When the equivalent ratio is inappropriate, the urethane formation reaction becomes insufficient.

<Epoxy Resin (D)>

As the epoxy resin (D) of one or more embodiments of the present invention, any epoxy resin (D) can be used as long as it has two or more epoxy groups in the molecule. For example, the epoxy resin includes liquid epoxy resins such as glycidyl ether-type epoxy resins such as bisphenol A diglycidyl ether and bisphenol F diglycidyl ether; cycloaliphatic epoxy resins such as 3,4-epoxycyclohexylmethyl carboxylate and 1,4-cyclohexanedimethanol diglycidyl ether; linear-aliphatic epoxy resins such as 1,4-butanediol diglycidyl ether, 1,6-hexanediol diglycidyl ether and polypropylene glycol diglycidyl ether; and glycidyl ester-type epoxy resins such as hexahydrophthalic acid glycidyl esters; glycidyl ester epoxy resin such as hexahydrophthalic acid glycidyl ester; solid or semisolid polyfunctional epoxy resins such as polysiloxane epoxy resins having an epoxy group at the end or side chain of polydimethylsiloxane, phenol novolac epoxy resins, cresol novolac epoxy resins, triphenyl glycidyl ether methane resins, tetraphenyl glycidyl ether methane resins, brominated phenol novolac epoxy resins, dicyclopentadiene novolac epoxy resins and naphthol novolac epoxy resins. The epoxy resin can be used individually or in the combination of two or more epoxy resins. Among these, glycidyl ether-type epoxy resins such as bisphenol A diglycidyl ether and bisphenol F diglycidyl ether are particularly preferable.

In one or more embodiments, a reactive diluent having one epoxy group in the molecule may be added to the epoxy resin (D). A reactive diluent having one or more reactive groups other than an epoxy group, for example, hydroxyl groups or carboxylic acid groups, in the molecule may be used if necessary. The reactive diluent has effects of reducing the viscosity of the epoxy resin composition. Preferably, the reactive diluent is used in an amount of up to 45 parts by weight per 100 parts by weight of the epoxy resin. When the reactive diluent is used in an excessive amount, the heat resistance of a cured product is lowered.

In one or more embodiments, the reactive diluents having one epoxy group in the molecule include alkyl monoglycidyl ether such as alkyl glycidyl ether having the carbon atoms of 8 to 14 such as butyl glycidyl ether, 2-ethyl hexyl glycidyl ether, phenol monoglycidyl ether such as phenyl glycidyl ether, nonyl phenyl glycidyl ether, and the like. These reactive diluents may be used in the combination of two or more reactive diluents.

In one or more embodiments, concrete examples of the reactive diluent having one or more hydroxyl groups or carboxylic groups in the molecule include silicon oil having a carboxylic group or a hydroxyl group. The reactive diluent may be used in the combination of two or more kinds.

<Epoxy Resin Curing Agent (E)>

As epoxy resin curing agent, well known curing agents such as amine curing agents such as dicyanediamide (DICY), diaminodiphenylmethane, diaminodiphenylsulfone, isophoronediamine, triethylenetetramine, polyetherdiamine, polyethertriamine; anhydrides such as methyltetrahydrophthalic acid anhydride, methylhexahydrophthalic acid anhydride, phenol curing agents such as phenol novolac resin, imidazoles such as 2-ethyl-4-methylimidazole, tertiary amine, polyamide, polymercaptan, melamine resin can be used. Among these, in one or more embodiments the amine curing agent is preferable, and isophoronediamine and polyether diamine are particularly preferable.

In one or more embodiments, an amount of the epoxy resin curing agent to be used depends on the chemical properties of the curing agent, the desired properties of the epoxy resin composition and the cured product. In the case of an amine group, an acid anhydride group, or a phenolic hydroxy group, it is preferably used so as to be 0.7 to 1.3 per epoxy group equivalent. It is preferable to use about 0.01 to 10 parts by weight of imidazole, tertiary amine or the like used as a curing accelerator per 100 parts by weight of the epoxy resin.

<Chain Extender (F) and Crosslinking Agent (G)>

In one or more embodiments, the chain extender (F) and the crosslinking agent (G) are used to adjust the mechanical characteristics and hardness of the polyurethane resin. As the chain extender (F) and the crosslinking agent (G), known chain extenders and crosslinking agents can be used. The molecular weight of the chain extender (F) and the crosslinking agent (G) is, for example, less than 600, more preferably from 18 to 400, and even preferably from 50 to 300. Preferred chain extenders are alkyl diols having 2 to 12 carbon atoms, alkanol amines having 2 to 12 carbon atoms, aliphatic diamines having 2 to 15 carbon atoms, and aromatic diamines having aromatic groups. Concrete examples thereof include alkyl diols such as 1,2-ethanediol, 1,4-butanediol, 1,6-hexanediol, 1,7-heptanediol, 1,8-octanediol and dipropylene glycol; alkanol amines such as ethanolamine, diethanolamine, 2-aminopropanol, 3-aminopropanol, 3-amino-2,2-dimethylpropanol, N-methyldiethanolamine, and triethanolamine; aliphatic diamines such as 1,2-ethylenediamine, 1,3-propylenediamine, 1,4-butylene diamine, 1,6-hexamethylenediamine, isophoronediamine, 1,4-cyclohexamethylenediamine and 4,4-diaminodicyclohexylmethane; and aromatic diamines such as 4,4-diaminodiphenylmethane, 3,3-dichloro-4,4-diaminodiphenylmethane, and trimethylene glycol-di-p-aminobenzoate. Besides these, bis(hydroxyethoxy)benzene and the like are preferred. In particular, 1,2-ethanediol, 1,4-butanediol, 1,6-hexanediol, 1,2-ethylenediamine, 3,3-dichloro-4,4-diaminodiphenylmethane, and the like are preferred in the light of balance between cost and physical properties. Examples of preferred crosslinking agents include polyfunctional polyols such as trifunctional polypropylene glycols such as glycerin, trimethylolpropane, pentaerythritol, sorbitol, and polyoxypropylene triol.

<Catalyst (H)>

A catalyst can be used in the synthesis of the polyurethane resin of one or more embodiments of the present invention. The catalyst is not particularly limited, but includes a catalyst that is commonly used to promote the urethane reaction. Specific examples of the catalyst include metal salts of carboxylic acids such as tin 2-ethylhexanoate, tin versatate, bismuth 2-ethylhexanoate, potassium acetate, potassium octylate, lead octylate, lead naphthenate, nickel naphthenate, and cobalt octylate; tetravalent organic tin compounds such as dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis (ethyl maleate), dioctyltin bis(octyl maleate), dibutyltin dimethoxide, dibutyltin bis(nonyl phenoxide), dibutenyltin oxide, dibutyltin bis(acetylacetonate), dibutyltin bis(ethyl acetoacetate), dibutyltin bisisooctylthioglycolate, dibutyltin dichloride, dibutyltin oxide, a reaction product of dibutyltin oxide and a silicate compound, a reaction product of a dialkyltin dicarboxylate (e.g. dibutyltin dilaurate) and a silicate compound, and a reaction product of dibutyltin oxide and a phthalic acid ester; organic titanates such as tetraisopropoxy titanium, tetra-n-butoxy titanium, diisopropoxytitanium bis(acetylacetonate), and diisopropoxytitanium bis(ethylacetoacetate); organoaluminum compounds such as aluminum tris(acetylacetonate), aluminum tris(ethylacetoacetate), and diisopropoxyaluminum ethylacetoacetate; zirconium compounds such as zirconium tetrakis (acetylacetonate); amine compounds such as triamylamine, trihexylamine, trioctylamine, triallylamine, triphenylamine, triethanolamine, triethylamine, tripropylamine, diethylethanolamine, dimethylaminoethoxyethanol, N,N,N'-trimethylaminoethylethanolamine, N,N,N',N",N"-pentamethyldiethylenetriamine, N,N,N',N'-tetramethylhexamethylenediamine, N,N,N',N'-tetramethylethylenediamine, N,N',N'-trimethylaminoethylpiperazine, N,N-dimethylcyclohexylamine, bis(2-dimethylaminoethyl) ether, guanidine, diphenylguanidine, 2,4,6-tris(dimethylaminomethyl)phenol, N-methylmorpholine, N-ethylmorpholine, N-octadecylmorpholine, N-methylpiperazine, N-methyl-N'-(2-hydroxypropyl) piperazine, 2-ethyl-4-methylimidazole, 1,8-diazabicyclo[5.4.0]undecene (DBU), 1,5-diazabicyclo[4.3.0]nonene (DBN), and 1,4-diazabicyclo[2.2.2]octane (DABCO), and the like. Also, salts of the amine compounds with carboxylic acids or organic acids (e.g. phenols), such as octylic acid salt of DBU, are effective as latent curing catalysts.

In one or more embodiments, an amount of the catalyst used is preferably 0.0001 to 5 parts by weight, more preferably 0.001 to 2 parts by weight, even preferably 0.005 to 0.5 parts by weight, and particularly preferably 0.01 to 1 part by weight per 100 parts by weight of the total amount of the polyol (A) containing the polyol (A-I) and the polyol (A-II), the core-shell polymer (B), and the polyisocyanate (C). If the amount of the catalyst used is less than 0.0001 parts by weight, effects of curing is not obtained in some cases. If the amount of the catalyst used exceeds 5 parts by weight, curing is too fast, resulting in difficulty in handling sometimes.

<Other Blending Components>

The polyol composition, the polyurethane resin composition, and the epoxy resin composition of one or more embodiments of the present invention may contain various blending components, if necessary. The amounts to be used may be an amount usually used with respect to the total amount of the components (A) to (C), components (A) to (C) and (F) or the components (A) to (C), (F), and (G). For example, WO 2014/196607 A discloses a filler, a flame retardant, a dispersant, an antifoamer, a plasticizer, a solvent, a tackifier, a leveling agent, a thixotropy imparting agent, an antioxidant, a light stabilizer, an ultraviolet absorber, a silane coupling agent, a dehydrating agent, and the like. Besides to these agents, foam stabilizers, wetting agents and the like as shown below can also be used.

<Foam Stabilizer>

To the polyol composition, the polyurethane resin composition, and the epoxy resin composition of one or more embodiments of the present invention, a foam stabilizer can be added, if necessary. When foamed polyurethane is produced, the size of the foam cell can be controlled by adding the foam stabilizer. As the foam stabilizer, a foam stabilizer to be used for producing a usual foamed polyurethane resin can be used. Examples of commercially available products of foam stabilizers include SZ-1919, SH192, SH190, SZ-584, SZ-5740M, SRX280A, SF2904, SZ-1142, SZ-1346E, SZ-1327, SZ-1336, SZ-1333, SZ-1360, PRX607, SF2937F, SF2938F, SZ-1671, SZ-1718, SZ-1677, SH193, SF2936F, SZ-1642, SF2945F, and SZ-1605 (all manufactured by Dow Corning Toray Co., Ltd.); F-114, F-121, F-122, and F-242 (all manufactured by Shin-Etsu Silicone Co., Ltd.); and L-540, L-566, L-580, L-595(LV), L-598, L-618, L-620, L-635, L-638, L-650, L-658, and L-668 (all manufactured by Momentive Performance Materials Inc.).

In one or more embodiments, when a foam stabilizer is used, the amount thereof is, for example, from 0.05 to 10 parts by weight, preferably from 0.2 to 5 parts by weight, and more preferably from 0.3 to 3 parts by weight per 100 parts by weight of the polyol (A). For the production of foamed polyurethane, the detailed description of "Polyurethanes: Science, Technology, Markets and Trends" 2015, Publisher: John Wiley & Sons can be referred to.

<Wetting Agent>

To the polyol composition, the polyurethane resin composition, and the epoxy resin composition of one or more embodiments of the present invention, a wetting agent can be added, if necessary. By adding a wetting agent, it is possible to improve the wettability and adhesion of the composition or the cured product thereof to other materials. As the wetting agent, a commercially available product can be used. Examples of commercially available products include wetting agents manufactured by Evonik Industries AG such as TEGO Twin4000, TEGO Wet240, TEGO WetKL245, TEGO Wet250, TEGO Wet260, TEGO Wet265, TEGO Wet270, TEGO Wet280, TEGO Wet500, TEGO Wet505, TEGO Wet510, and TEGO W520.

In one or more embodiments, the amount of a wetting agent to be used is, for example, from 0.05 to 5 parts by weight, preferably from 0.1 to 3 parts by weight, and more preferably from 0.2 to 1.5 parts by weight per 100 parts by weight of the total amount of the components (A) to (C), the components (A) to (D) or the components (A) to (E), or 100 parts by weight of the total amount of the components (A) to (C) and (F) or the components (A) to (C), (F), and (G).

<Use>

The polyol composition of one or more embodiments of the present invention is suitable as a raw material for polyurethane resin, epoxy resin and the like, and the cured product obtained from polyurethane resin and epoxy resin have excellent mechanical properties (toughness and tensile strength). The polyurethane resin can be used for a wide range of rigid structural members, flexible elastomer members, and flexible/rigid foam members.

The present application claims the benefit of priority to Japanese Patent Application Number 2016-031278 filed on Feb. 22, 2016. The entire contents of the specification of Japanese Patent Application Number 2016-031278 filed on Feb. 22, 2016 are hereby incorporated by reference.

EXAMPLES

Next, one or more embodiments of the present invention will be described in detail with reference to Examples and Comparative Example, but the present invention is not limited thereto, and the variation and the modification of the present invention without departing the gist described above and below are all included the technical scope of the present invention. In the following Examples and Comparative Examples, "part(s)" and "%" mean "part(s) by weight" and "% by weight", respectively.

First, the measurement method and the test method of Production Examples, Examples, and Comparative Examples will be described below.

[1] Measurement of Volume Average Particle Diameter of Core-Shell Polymer

The volume average particle diameter (Mv) of the core-shell polymer dispersed in an aqueous latex was measured using a Microtrac UPA150 (manufactured by Nikkiso Co., Ltd.). The aqueous latex containing dispersed core-shell polymer was diluted with deionized water and were used as a measurement sample.

[2] Measurement of MEK Insoluble Content of Core-Shell Polymer

Two grams of the powder of the core-shell polymer obtained by drying a latex is immersed in 100 g of methylethylketone (MEK) at 23° C. for 24 hours, separated in MEK soluble content and MEK insoluble content, and collected MEK insoluble content. Thus, the MEK insoluble content is dried and weighed to calculate a weight ratio of MEK insoluble content to the weight of the core-shell polymer.

[3] Dispersibility of Core-Shell Polymer in Polyol Composition

To 1 g of polyol composition (0.4 g or 0.52 g of core-shell polymer), 10 g of MEK was added, a mixture was shaken fifty times, stood still at 23° C. for 30 minutes, and the generation of the precipitation was visually observed. The case where the precipitation was not generated and a uniform dispersion was obtained was considered as "pass", and the case where the precipitation was generated, and/or a uniform dispersion was not obtained was considered as "failure".

[4] Evaluation of Toughness of Cured Product

The toughness of the hard polyurethane or the cured product obtained from the epoxy resin composition was evaluated according to ASTM 5045. A test piece having a size of 60 mm (length)×12 mm (width)×5 mm (height) was cut from the molded product. A precrack was introduced in the test piece. A three-point bending test of the test piece was carried out at 23° C. to obtain fracture strain energy release rate G1c (J/m$^2$). This G1c was considered as an index of toughness.

[5] Measurement of Glass Transition Temperature (Tg) of Cured Product

The glass transition temperature of the cured product (20 mg) was measured under a nitrogen flow using a differential scanning calorimeter DSC 220C manufactured by Seiko Instruments Inc. As the measurement method, the temperature was elevated from 50° C. to 220° C. at a temperature elevation rate of 20° C. per minute, then immediately lowered to 50° C. at a rate of 40° C. per minute to eliminate a thermal history, and the temperature was elevated from 50° C. to 220° C. at a temperature elevation rate of 20° C. per minute to measure the glass transition temperature.

[6] Tensile Characteristics

A flexible polyurethane resin sheet or a thermoplastic urethane elastomer sheet was punched into a JIS dumbbell No. 3 test piece. This test piece was used to perform a tensile test at 23° C. The tensile test was performed at a distance between checks of 50 mm and a distance between marked lines of 20 mm at a rate of 200 mm/min to evaluate the tensile characteristics. The tensile strength at 100% or 500% elongation is a strength value when the test piece is elongated by 100% or 500% in the above test. The tensile elongation at break is a value in which the test piece is elongated until it breaks in the above test.

[7] Measurement of Hydroxyl Group Equivalent as Active Hydrogen Equivalent

The hydroxyl value (mg KOH/g) was measured based on JIS K0070. By applying this hydroxyl value to the equation of hydroxyl group equivalent=56100/hydroxyl value, the hydroxyl group equivalent was calculated as the active hydrogen equivalent.

[8] Isocyanate Equivalent

The isocyanate equivalent represents the weight per isocyanate group. This weight corresponds to a value obtained by dividing the molecular weight of the polyisocyanate by the number of isocyanate groups present in the same molecule. Analytically, the content rate (%) of the isocyanate group is measured based on JIS K1603 and the content is applied to the equation: isocyanate equivalent=4200/content rate of isocyanate group, thereby determining the weight per isocyanate group. In this Example, the molecular weight of the used polyisocyanate was divided by the number of isocyanate groups, whereby the weight per isocyanate group was determined.

The polyol (A), the core-shell polymer (B), the polyisocyanate (C), the epoxy resin (D), and the epoxy resin curing agent (E), as well as other blending components used in the Examples and the Comparative Examples are shown. A dispersion (I) was prepared by dispersing the core-shell polymer (B) in the polyol (A-I).

<Polyol (A)>

A-1: Polyoxypropylene diol having an average molecular weight of 2000 (Actcol (registered trademark) D-2000, manufactured by Mitsui Chemicals, Inc., hydroxyl group equivalent: 1002 g/eq)

A-2: Polyoxypropylene diol having an average molecular weight of 1000 (Actcol (registered trademark) D-1000, manufactured by Mitsui Chemicals, Inc., hydroxyl group equivalent weight: 501 g/eq)

A-3: Poloxypropylene diol having an average molecular weight of 3000 (Actcol (registered trademark) D-3000 manufactured by Mitsui Chemicals, Inc., hydroxyl group equivalent: 1496 g/eq)

A-4: Ethylene oxide adduct of polyoxypropylene triol having an average molecular weight of 7020 (Actcol (registered trademark) EP-901P, manufactured by Mitsui Chemicals, Inc., hydroxyl group equivalent: 2340 g/eq)

A-5: Polyoxypropylene diol having an average molecular weight of 400 (Actcol (registered trademark) D-400, manufactured by Mitsui Chemicals, Inc., hydroxyl group equivalent: 200 g/eq)

A-6: Polyoxypropylene diol having an average molecular weight of 192 (tripropylene glycol, manufactured by Wako Pure Chemical Industries, Ltd., hydroxyl group equivalent: 96 g/eq)

A-7: Polytetramethylene glycol having an average molecular weight of 1000 (PTMG-1000, manufactured by Mitsubishi Chemical Corporation, hydroxyl group equivalent: 501 g/eq)

<Core-Shell Polymer (B)>

Refer to the Production Examples described later.

<Polyisocyanate (C)>

C-1: Polymethylenepolyphenyl polyisocyanate (Cosmonate M-200, manufactured by Mitsui Chemicals, Inc., isocyanate equivalent: 133 g/eq)

C-2: 3-isocyanatomethyl-3,3,5-trimethylcyclohexyl isocyanate (isophorone diisocyanate, manufactured by Tokyo Chemical Industry Co., Ltd., isocyanate equivalent: 112 g/eq)

C-3: 4,4'-diphenylmethane diisocyanate (manufactured by Tokyo Chemical Industry Co., Ltd., diphenylmethane diisocyanate, isocyanate equivalent: 125 g/eq)

C-4: Tolylene diisocyanate (Cosmonate T-80, manufactured by Mitsui Chemicals, Inc., isocyanate equivalent: 87 g/eq)

<Epoxy Resin (D)>
D-1: Bisphenol A diglycidyl ether (jER 828EL, manufactured by Mitsubishi Chemical Corporation)
<Epoxy Resin Curing Agent (E)>
E-1: Isophoronediamine (VESTAMIN IPD, manufactured by Evonik Industries AG)
E-2: Polyether diamine (JEFFAMIN D-230, manufactured by Huntsman Corporation)
<Chain Extender (F)>
F-1: 1,4-butanediol (manufactured by Mitsubishi Chemical Corporation, hydroxyl equivalent: 49 g/eq)
<Crosslinking Agent (G)>
G-1: Polyoxypropylene triol having an average molecular weight of 300 (Actcol (registered trademark) T-300, manufactured by Mitsui Chemicals, Inc., hydroxyl group equivalent: 106 g/eq)
<Catalyst (H)>
H-1: Octyl acid salt of 1,8-diazabicyclo[5.4.0]undecene-7 (DBU-octyl acid salt, U-CAT SA102, manufactured by San-Apro Ltd.)
H-2: 1,4-diazabicyclo[2.2.2]octane (DABCO-33LV, manufactured by Sigma-Aldrich)
H-3: Tin catalyst (Neostan U28, manufactured by Nitto Kasei Co., Ltd.)
<Core-Shell Polymer (B)>
B-1 to B-10 and B-15 to B-20: Core-shell polymer in which the main component of the core layer is a butadiene rubber
B-11: Core-shell polymer in which the main component of the core layer is a polystyrene polymer
B-12: Core-shell polymer in which the main component of the core layer is a polyorganosiloxane rubber
B-13 and B-14: Core-shell polymer in which the main component of the core layer is an acrylic rubber The Production Examples of the core-shell polymer (B) are shown below.

DESCRIPTION OF REFERENCE SIGNS

EDTA: Disodium ethylenediaminetetraacetate
SDS: Sodium dodecylbenzenesulfonate
PHP: p-menthane hydroperoxide
SFS: Sodium formaldehyde sulfoxylate
CHP: Cumene hydroperoxide
ST: Styrene
AN: Acrylonitrile
AMA: Allyl methacrylate
MMA: Methyl methacrylate
HBA: 4-hydroxybutyl acrylate
EHA: 2-ethylhexyl acrylate
BA: Butyl acrylate
BMA: Butyl methacrylate
GMA: Glycidyl methacrylate
MEK: Methyl ethyl ketone
BDR: Polybutadiene rubber
PST: Polystyrene
SIR: Polyorganosiloxane rubber
ACR: Acrylic rubber (Production of Core-Shell Polymer (B))

1. Preparation of Latex Containing Core Polymer

Production Example 1-1; Preparation of Latex (R-1) Containing Polybutadiene Rubber (BDR)

Into a pressure resistant polymerization reactor, 200 parts of deionized water, 0.03 parts of tripotassium phosphate, 0.25 parts of potassium dihydrogen phosphate, 0.002 parts of disodium ethylenediaminetetraacetate (EDTA), 0.001 parts of ferrous sulfate heptahydrate (FE) and 1.5 parts of sodium dodecylbenzenesulfonate (SDS) were charged, and stirred while sufficient nitrogen purge was performed to remove oxygen. Then, 100 parts of butadiene (BD) was fed to the system, and the mixture was heated to 45° C. To this, 0.015 parts of paramenthane hydroperoxide (PHP) and subsequently 0.04 parts of sodium formaldehyde sulfoxylate (SFS) were added to initiate polymerization. Additionally, 0.3 parts of SDS, 0.01 parts of PHP, 0.0015 parts of EDTA, and 0.001 parts of FE were charged at the time of 4 hours from the start of the polymerization. At the time of 10 hours from the start of the polymerization, remaining monomers were distilled off and removed under reduced pressure to stop the polymerization, so that a latex (R-1) containing polybutadiene rubber (BDR) particles was obtained. A conversion rate of the polymerization was 99% or more. The polybutadiene rubber particles contained in the resulting latex had a volume average particle diameter of 0.10 μm.

Production Example 1-2; Preparation of Latex (R-2) Containing Polystyrene (PST)

Into a five-necked glass reactor equipped with a thermometer, a reflux condenser, a nitrogen inlet and an apparatus for adding monomers and an emulsifying agent, 220 parts of deionized water, 0.004 parts of disodium ethylenediaminetetraacetate (EDTA), 0.002 parts of ferrous sulfate heptahydrate (FE), 0.2 parts of sodium formaldehyde sulfoxylate (SFS), and 0.6 parts of sodium dodecylbenzenesulfonate (SDS) were charged, and stirred in a nitrogen gas stream, and a mixture was heated to 60° C.

Next, a mixture containing 10 parts of ST, 1 part of AMA, 0.003 parts of CHP was collectively added thereto, and a mixture was stirred for 1 hour.

Additionally, a mixture containing 86 parts of ST, 3 parts of AMA, and 0.03 parts of CHP was continuously added over 4 hours. In addition, 0.2 parts of SDS was charged at the time of 2 hours and 4 hours from the start of the addition of the mixture. From the completion of the addition of the mixture, stirring was continued for 1 hour to stop the polymerization, so that a latex (R-2) containing crosslinked PST particles was obtained. A conversion rate of the polymerization was 99% or more. The PST particles contained in the resulting latex had a volume average particle diameter of 0.11 μm.

Production Example 1-3; Preparation of Latex (R-3) Containing Polyorganosiloxane Rubber (SIR)

A mixture containing 251 parts of deionized water, 1.8 parts of dodecylbenzenesulfonic acid, 100 parts of octamethylcyclotetrasiloxane, 2 parts of tetraethoxysilane, 2 parts of γ-methacryloxypropylmethyldimethoxysilane was stirred with a homomixer at 10000 rpm for 5 minutes, to prepare a siloxane emulsion. The siloxane emulsion was allowed to pass through a high-pressure homogenizer two times under a pressure of 30 MPa. The emulsion was rapidly charged in a lump into a five-necked glass reactor equipped with a thermometer, a stirrer, a reflux condenser, a nitrogen inlet and an apparatus for adding auxiliary raw materials including monomers and an emulsifying agent. The reaction was initiated at 80° C. over 40 minutes while stirring the system. The reaction was continued at 80° C. for 6 hours. After that, the system was cooled to 25° C. and then left for 20 hours, and the pH value of the system was adjusted to 6.8 with sodium hydroxide, and the polymerization was terminated, thereby producing a latex (R-3) which contained polyorganosiloxane rubber (SIR) particles. A conversion rate of the polymerization was 87%. The polyorganosiloxane rubber particles contained in the latex had a volume average particle diameter of 0.30 µm.

Production Example 1-4; Preparation of Latex (R-4) Containing Acrylic Rubber (ACR)

Into a five-necked glass reactor equipped with a thermometer, a reflux condenser, a nitrogen inlet and an apparatus for adding monomers and an emulsifying agent, 225 parts of deionized water, 0.002 parts of EDTA, 0.001 parts of FE, 0.05 parts of SFS and 0.4 parts of SDS were charged. Subsequently, the system was heated to 60° C. while stirring in a nitrogen gas stream.

A mixture containing 3 parts of EHA, 6.6 parts of BA, 0.4 parts of AMA, and 0.002 parts of CHP was collectively added thereto, and a mixture was stirred for 1 hour.

Subsequently, a mixture containing 27 parts of EHA, 59.4 parts of BA, 3.6 parts of AMA, and 0.02 parts of CHP was added dropwise to the system over 4 hours. At 2 hours and 4 hours with the addition of the mixture, 0.2 parts of SDS was also added. The stirring of the system was continued for 1 hour after the completion of the addition of the mixture to complete the polymerization, thereby producing a latex (R-4) which contained acrylic rubber (ACR) particles. A conversion rate of the polymerization was 99% or more. The acrylic rubber particles contained in the latex had a volume average particle diameter of 0.18 µm.

2. Preparation of Latex Containing Core-Shell Polymer (B)

Production Example 2-1; Preparation of Latex Containing Core-Shell Polymer (B-1)

Into a five-necked glass reactor equipped with a thermometer, a reflux condenser, a nitrogen inlet and an apparatus for adding monomers and an emulsifying agent, 1549 parts of the latex (R-1) obtained in Production Example 1-1 (corresponding to 510 parts of polybutadiene rubber (BDR) particles) and 315 parts of deionized water were charged, and stirred at 60° C. while nitrogen purge was performed. After 0.024 parts of EDTA, 0.006 parts of FE, and 1.2 parts of SFS were added, graft polymerization was performed by continuously adding a mixture of a graft monomer (42 parts of BA, 42 parts of MMA, 6 parts of HBA) and 0.2 parts of CHP over 2 hours. After the completion of the addition, the mixture was further stirred for 2 hours to complete the reaction and a latex containing core-shell polymer (B-1) was obtained. A conversion rate of the polymerization was 99% or more. An amount of the core layer of the core shell polymer (B-1) was 85% based on amounts of used monomers and the conversion rate. The core-shell polymer (B-1) contained in the resulting latex had a volume average particle diameter of 0.11 µm and MEK insoluble content of 98%.

Production Example 2-2: Preparation of Latex Containing Core-Shell Polymer (B-2)

The same procedure as in Production Example 2-1 was carried out, except that 59 parts of BA, 59 parts of MMA, 9 parts of HBA were used in place of 42 parts of BA, 42 parts of MMA, 6 parts of HBA as monomers for forming the shell layer. In this manner, core-shell polymer (B-2)-containing aqueous latex was produced. A conversion rate of the polymerization was 99% or more. An amount of the core layer of the core shell polymer (B-2) was 80% based on amounts of used monomers and the conversion rate. The core-shell polymer (B-2) contained in the aqueous latex had a volume average particle diameter of 0.11 µm and MEK insoluble content of 98%.

Production Example 2-3: Preparation of Latex Containing Core-Shell Polymer (B-3)

The same procedure as in Production Example 2-1 was carried out, except that 26 parts of BA, 26 parts of MMA, 4 parts of HBA were used in place of 42 parts of BA, 42 parts of MMA, 6 parts of HBA as monomers for forming the shell layer. In this manner, core-shell polymer (B-3)-containing aqueous latex was produced. A conversion rate of the polymerization was 99% or more. An amount of the core layer of the core shell polymer (B-3) was 90% based on amounts of used monomers and the conversion rate. The core-shell polymer (B-3) contained in the aqueous latex had a volume average particle diameter of 0.11 µm and MEK insoluble content of 98%.

Production Example 2-4: Preparation of Latex Containing Core-Shell Polymer (B-4)

The same procedure as in Production Example 2-1 was carried out, except that 68 parts of BA, 19 parts of MMA, 3 parts of HBA were used in place of 42 parts of BA, 42 parts of MMA, 6 parts of HBA as monomers for forming the shell layer. In this manner, core-shell polymer (B-4)-containing aqueous latex was produced. A conversion rate of the polymerization was 99% or more. An amount of the core layer of the core shell polymer (B-4) was 85% based on amounts of used monomers and the conversion rate. The core-shell polymer (B-4) contained in the aqueous latex had a volume average particle diameter of 0.11 µm and MEK insoluble content of 98%.

Production Example 2-5: Preparation of Latex Containing Core-Shell Polymer (B-5)

The same procedure as in Production Example 2-1 was carried out, except that 45 parts of BA, 42 parts of MMA, 3 parts of HBA were used in place of 42 parts of BA, 42 parts of MMA, 6 parts of HBA as monomers for forming the shell layer. In this manner, core-shell polymer (B-5)-containing aqueous latex was produced. A conversion rate of the polymerization was 99% or more. An amount of the core layer of the core shell polymer (B-5) was 85% based on amounts of used monomers and the conversion rate. The core-shell polymer (B-5) contained in the aqueous latex had a volume average particle diameter of 0.11 µm and MEK insoluble content of 98%.

Production Example 2-6: Preparation of Latex Containing Core-Shell Polymer (B-6)

The same procedure as in Production Example 2-1 was carried out, except that 32 parts of BA, 55 parts of MMA, 3 parts of HBA were used in place of 42 parts of BA, 42 parts of MMA, 6 parts of HBA as monomers for forming the shell layer. In this manner, core-shell polymer (B-6)-containing aqueous latex was produced. A conversion rate of the polymerization was 99% or more. An amount of the core layer of the core shell polymer (B-6) was 85% based on amounts of used monomers and the conversion rate. The core-shell polymer (B-6) contained in the aqueous latex had a volume average particle diameter of 0.11 µm and MEK insoluble content of 98%.

Production Example 2-7: Preparation of Latex Containing Core-Shell Polymer (B-7)

The same procedure as in Production Example 2-1 was carried out, except that 31 parts of BA, 53 parts of MMA, 3 parts of HBA, 3 parts of GMA were used in place of 42 parts of BA, 42 parts of MMA, 6 parts of HBA as monomers for forming the shell layer. In this manner, core-shell polymer (B-7)-containing aqueous latex was produced. A conversion rate of the polymerization was 99% or more. An amount of the core layer of the core shell polymer (B-7) was 85% based on amounts of used monomers and the conversion rate. The core-shell polymer (B-7) contained in the aqueous latex had a volume average particle diameter of 0.11 µm and MEK insoluble content of 98%.

Production Example 2-8: Preparation of Latex Containing Core-Shell Polymer (B-8)

The same procedure as in Production Example 2-1 was carried out, except that 25 parts of BA, 62 parts of MMA, 3 parts of HBA were used in place of 42 parts of BA, 42 parts of MMA, 6 parts of HBA as monomers for forming the shell layer. In this manner, core-shell polymer (B-8)-containing aqueous latex was produced. A conversion rate of the polymerization was 99% or more. An amount of the core layer of the core shell polymer (B-8) was 85% based on amounts of used monomers and the conversion rate. The core-shell polymer (B-8) contained in the aqueous latex had a volume average particle diameter of 0.11 µm and MEK insoluble content of 98%.

Production Example 2-9: Preparation of Latex Containing Core-Shell Polymer (B-9)

The same procedure as in Production Example 2-1 was carried out, except that 48 parts of BA, 42 parts of MMA were used in place of 42 parts of BA, 42 parts of MMA, 6 parts of HBA as monomers for forming the shell layer. In this manner, core-shell polymer (B-9)-containing aqueous latex was produced. A conversion rate of the polymerization was 99% or more. An amount of the core layer of the core shell polymer (B-9) was 85% based on amounts of used monomers and the conversion rate. The core-shell polymer (B-9) contained in the aqueous latex had a volume average particle diameter of 0.11 µm and MEK insoluble content of 98%.

Production Example 2-10: Preparation of Latex Containing Core-Shell Polymer (B-10)

The same procedure as in Production Example 2-1 was carried out, except that 48 parts of BMA, 42 parts of MMA were used in place of 42 parts of BA, 42 parts of MMA, 6 parts of HBA as monomers for forming the shell layer. In this manner, core-shell polymer (B-10)-containing aqueous latex was produced. A conversion rate of the polymerization was 99% or more. An amount of the core layer of the core shell polymer (B-10) was 85% based on amounts of used monomers and the conversion rate. The core-shell polymer (B-10) contained in the aqueous latex had a volume average particle diameter of 0.11 µm and MEK insoluble content of 98%.

Production Example 2-11: Preparation of Latex Containing Core-Shell Polymer (B-11)

Into a five-necked glass reactor equipped with a thermometer, a reflux condenser, a nitrogen inlet and an apparatus for adding monomers and an emulsifying agent, 1646 parts of the latex (R-2) produced in Production Example 1-2 (which contained 510 parts of PST particles) and 315 parts of deionized water were charged. The system was stirred at 60° C. while being purged with nitrogen. Subsequently, 0.024 parts of EDTA, 0.006 parts of ferrous sulfate heptahydrate and 1.2 parts of SFS were added. Subsequently, a mixture containing 42 parts of BA, 42 parts of MMA, 6 parts of HBA, and 0.2 parts of CHP was continuously added over 2 hours to initiate the graft polymerization. After the completion of the addition, the stirring was further continued for 2 hours to complete the polymerization, thereby producing a core-shell polymer (B-11)-containing aqueous latex. A conversion rate of the polymerization was 99% or more. An amount of the core layer of the core-shell polymer (B-11) was 85% based on amounts of used monomers and the conversion rate. The core-shell polymer (B-11) contained in the aqueous latex had a volume average particle diameter of 0.12 µm and MEK insoluble content of 98%.

Production Example 2-12: Preparation of Latex Containing Core-Shell Polymer Latex (B-12)

Into a five-necked glass reactor equipped with a thermometer, a reflux condenser, a nitrogen inlet and an apparatus for adding monomers and an emulsifying agent, 2016 parts of the latex (R-3) produced in Production Example 1-3 (which contained 510 parts of polyorganosiloxane rubber (SIR) particles) was charged. The system was stirred at 60° C. while being purged with nitrogen. Subsequently, 0.024 parts of EDTA, 0.006 parts of ferrous sulfate heptahydrate and 1.2 parts of SFS were added. Subsequently, a mixture containing 42 parts of BA, 42 parts of MMA, 6 parts of HBA, and 0.2 parts of CHP was continuously added over 2 hours to initiate the graft polymerization. After the completion of the addition, the stirring was further continued for 2 hours to complete the polymerization, thereby producing a core-shell polymer (B-12)-containing aqueous latex. A conversion rate of the polymerization was 99% or more. An amount of the core layer of the core-shell polymer (B-12) was 85% based on amounts of used monomers and the conversion rate. The core-shell polymer (B-12) contained in the aqueous latex had a volume average particle diameter of 0.32 µm and MEK insoluble content of 96%.

Production Example 2-13: Preparation of Latex Containing Core-Shell Polymer (B-13)

Into a five-necked glass reactor equipped with a thermometer, a reflux condenser, a nitrogen inlet and an apparatus for adding monomers and an emulsifying agent, 1670 parts of the latex (R-4) produced in Production Example 1-4 (which contained 510 parts of acrylic rubber (ACR) particles) and 0.1 parts of SDS were charged. The system was stirred at 60° C. while being purged with nitrogen. Subsequently, 0.024 parts of EDTA, 0.006 parts of ferrous sulfate heptahydrate and 1.2 parts of SFS were added. Subsequently, a mixture containing 42 parts of BA, 42 parts of MMA, 6 parts of HBA, and 0.3 parts of t-butyl hydroperoxide (t-BHP) was continuously added over 2 hours to initiate the graft polymeization. After the completion of the addition, the stirring was further continued for 2 hours to complete the polymerization, thereby producing a core-shell polymer (B-13)-containing aqueous latex. A conversion rate of the polymerization was 99% or more. An amount of the core layer of the core shell polymer (B-13) was 85% based on amounts of used monomers and the conversion rate. The core-shell polymer (B-13) contained in the aqueous latex had a volume average particle diameter of 0.19 μm and MEK insoluble content of 99%.

Production Example 2-14: Preparation of Latex Containing Core-Shell Polymer (B-14)

The same procedure as in Production Example 2-13 was carried out, except that 78 parts of EHA, 11 parts of MMA, 1 part of HBA were used in place of 42 parts of BA, 42 parts of MMA, 6 parts of HBA as monomers for forming the shell layer. In this manner, core-shell polymer (B-14)-containing aqueous latex was produced. A conversion rate of the polymerization was 99% or more. An amount of the core layer of the core shell polymer (B-14) was 85% based on amounts of used monomers and the conversion rate. The core-shell polymer (B-14) contained in the aqueous latex had a volume average particle diameter of 0.19 μm and MEK insoluble content of 99%.

Production Example 2-15: Preparation of Latex Containing Core-Shell Polymer (B-15)

The same procedure as in Production Example 2-1 was carried out, except that 18 parts of BA, 69 parts of MMA, 3 parts of HBA were used in place of 42 parts of BA, 42 parts of MMA, 6 parts of HBA as monomers for forming the shell layer. In this manner, core-shell polymer (B-15)-containing aqueous latex was produced. A conversion rate of the polymerization was 99% or more. An amount of the core layer of the core shell polymer (B-15) was 85% based on amounts of used monomers and the conversion rate. The core-shell polymer (B-15) contained in the aqueous latex had a volume average particle diameter of 0.11 μm and MEK insoluble content of 98%.

Production Example 2-16: Preparation of Latex Containing Core-Shell Polymer (B-16)

The same procedure as in Production Example 2-1 was carried out, except that 85 parts of BMA, 2 parts of MMA, 3 parts of HBA were used in place of 42 parts of BA, 42 parts of MMA, 6 parts of HBA as monomers for forming the shell layer. In this manner, core-shell polymer (B-16)-containing aqueous latex was produced. A conversion rate of the polymerization was 99% or more. An amount of the core layer of the core shell polymer (B-16) was 85% based on amounts of used monomers and the conversion rate. The core-shell polymer (B-16) contained in the aqueous latex had a volume average particle diameter of 0.11 μm and MEK insoluble content of 98 t.

Production Example 2-17: Preparation of Latex Containing Core-Shell Polymer (B-17)

The same procedure as in Production Example 2-1 was carried out, except that 65 parts of ST, 25 parts of AN were used in place of 42 parts of BA, 42 parts of MMA, 6 parts of HBA as monomers for forming the shell layer. In this manner, core-shell polymer (B-17)-containing aqueous latex was produced. A conversion rate of the polymerization was 99% or more. An amount of the core layer of the core shell polymer (B-17) was 85% based on amounts of used monomers and the conversion rate. The core-shell polymer (B-17) contained in the aqueous latex had a volume average particle diameter of 0.11 μm and MEK insoluble content of 98%.

Production Example 2-18: Preparation of Latex Containing Core-Shell Polymer (B-18)

The same procedure as in Production Example 2-1 was carried out, except that 36 parts of ST, 36 parts of MMA, 18 parts of HBA were used in place of 42 parts of BA, 42 parts of MMA, 6 parts of HBA as monomers for forming the shell layer. In this manner, core-shell polymer (B-18)-containing aqueous latex was produced. A conversion rate of the polymerization was 99% or more. An amount of the core layer of the core shell polymer (B-18) was 85% based on amounts of used monomers and the conversion rate. The core-shell polymer (B-18) contained in the aqueous latex had a volume average particle diameter of 0.11 μm and MEK insoluble content of 98%.

Production Example 2-19: Preparation of Latex Containing Core-Shell Polymer (B-19)

A latex containing a core shell polymer (B-19) was prepared according to Production Example 2 of WO09/014037. That is, into a five-necked glass reactor equipped with a thermometer, a reflux condenser, a nitrogen inlet and an apparatus for adding monomers and an emulsifying agent, 1458 parts of the latex (R-1) produced in Production Example 1-1 (which contained 480 parts of BDR particles) and 440 parts of deionized water were charged. The system was stirred at 70° C. while being purged with nitrogen. Subsequently, 1.2 parts of azobisisobutylonitrile was added thereto. Subsequently, a mixture containing 42 parts of ST, 42 parts of MMA, 36 parts of HBA was continuously added over 2 hours to initiate the graft polymerization. After the completion of the addition, the stirring was further continued for 2 hours to complete the polymerization, thereby producing a core-shell polymer (B-19)-containing aqueous latex. The conversion rate of the polymerization was 99% or more. An amount of the core layer of the core shell polymer (B-19) was 80% based on amounts of used monomers and the conversion rate. The core-shell polymer (B-19) contained in the aqueous latex had a volume average particle diameter of 0.11 μm and MEK insoluble content of 98%.

Production Example 2-20: Preparation of Latex Containing Core-Shell Polymer (B-20)

The same procedure as in Production Example 2-1 was carried out, except that 90 parts of MMA was used in place of 42 parts of BA, 42 parts of MMA, 6 parts of HBA as monomers for forming the shell layer. In this manner, core-shell polymer (B-20)-containing aqueous latex was produced. A conversion rate of the polymerization was 99 S or more. An amount of the core layer of the core shell polymer (B-20) was 85% based on amounts of used monomers and the conversion rate. The core-shell polymer (B-20) contained in the aqueous latex had a volume average particle diameter of 0.11 μm and MEK insoluble content of 98%.

Properties of core-shell polymers obtained are shown in Tables 1 and 2.

TABLE 1

|  |  |  |  |  | Production Example 2-1 | Production Example 2-2 | Production Example 2-3 | Production Example 2-4 | Production Example 2-5 | Production Example 2-6 | Production Example 2-7 | Production Example 2-8 | Production Example 2-9 | Production Example 2-10 |
|---|---|---|---|---|---|---|---|---|---|---|---|---|---|---|
| Core layer | Core shell polymer | | | | B-1 | B-2 | B-3 | B-4 | B-5 | B-6 | B-7 | B-8 | B-9 | B-10 |
| | Component | | | | BDR | BDR | BDR | BDR | BDR | BDR | BDR | BDR | BDR | BDR |
| | Weight (%) | | | | 85 | 80 | 90 | 85 | 85 | 85 | 85 | 85 | 85 | 85 |
| | Solid content of latex (parts by weight) | | | | 510 | 510 | 510 | 510 | 510 | 510 | 510 | 510 | 510 | 510 |
| Shell layer | Component | | | | BA MMA HBA | BA MMA HBA | BA MMA HBA | BA MMA HBA | BA MMA HBA | BA MMA HBA | BA MVA HBA GMA | BA MVA HBA | BA MMA HBA | BMA MMA |
| | | Tg(°C.) | Tg(K) | SP value | | | | | | | | | | |
| BA | Alkylacrylate(C4) | −54 | 219 | 9.77 | 42 | 59 | 26 | 68 | 45 | 32 | 31 | 25 | 48 | |
| BMA | Alkylmethacrylate(C4) | 20 | 293 | 9.45 | | | | | | | | | | 48 |
| MMA | Alkylmethacrylate(C1) | 105 | 378 | 9.93 | 42 | 59 | 26 | 19 | 42 | 55 | 53 | 62 | 42 | 42 |
| HBA | 4-hydroxyalkylacrylate | −40 | 233 | 12.99 | 6 | 9 | 4 | 3 | 3 | 3 | 3 | 3 | | |
| ST | Styrene | 100 | 373 | 10.32 | | | | | | | | | | |
| AN | Acrylonitrile | 85 | 358 | 11.21 | | | | | | | | | | |
| EHA | Alkylacrylate(C8) | −50 | 223 | 9.22 | | | | | | | | | | |
| GMA | Glycidylmethacrylate | 48 | 319 | 11.45 | | | | | | | 3 | | | |
| | * Amount (% by weight) | | | | 47 | 46 | 46 | 76 | 50 | 36 | 34 | 28 | 53 | 53 |
| | Solubility parameter SP(cal/cm³)^(1/2) | | | (Value calculated from values in Table) | 10.06 | 10.07 | 10.07 | 9.91 | 9.95 | 9.98 | 10.03 | 9.99 | 9.84 | 9.67 |
| | Tg (°C.) | | | (Value calculated from values in Table) | 1 | 1 | 1 | −32 | 0 | 23 | 23 | 36 | −1 | 54 |
| Volume average particle diameter | | μm | | | 0.11 | 0.11 | 0.11 | 0.11 | 0.11 | 0.11 | 0.11 | 0.11 | 0.11 | 0.11 |
| MEK insoluble content | | Weight (%) | | | 98 | 98 | 98 | 98 | 98 | 98 | 98 | 98 | 98 | 98 |

* Amount: % by weight of alkyl (meth)acrylate having alkyl group of 4 to 10 carbons in shell layer

TABLE 2

|  |  |  |  |  | Production Example 2-11 | Production Example 2-12 | Production Example 2-13 | Production Example 2-14 | Production Example 2-15 | Production Example 2-16 | Production Example 2-17 | Production Example 2-18 | Production Example 2-19 | Production Example 2-20 |
|---|---|---|---|---|---|---|---|---|---|---|---|---|---|---|
| Core layer | Core shell polymer | | | | B-11 | B-12 | B-13 | B-14 | B-15 | B-16 | B-17 | B-18 | B-19 | B-20 |
| | Component | | | | PST | SIR | ACR | ACR | BDR | BDR | BDR | BDR | BDR | BDR |
| | Weight (%) | | | | 85 | 85 | 85 | 85 | 85 | 85 | 85 | 85 | 80 | 85 |
| | Solid content of latex (parts by weight) | | | | 510 | 510 | 510 | 510 | 510 | 510 | 510 | 510 | 480 | 510 |
| Shell layer | Component | | | | BA MMA HBA | BA MMA HBA | BA MMA HBA | EHA MMA HBA | BA MMA HBA | BA MMA HBA | ST AN | ST MMA HBA | ST MMA HBA | MMA |
| | | Tg(°C.) | Tg(K) | SP value | | | | | | | | | | |
| BA | Alkylacrylate(C4) | −54 | 219 | 9.77 | 42 | 42 | 42 | | 18 | 85 | | | | |
| BMA | Alkylmethacrylate(C4) | 20 | 293 | 9.45 | | | | | | | | | | |
| MMA | Alkylmethacrylate(C1) | 105 | 378 | 9.93 | 42 | 42 | 42 | 11 | 69 | 2 | | 36 | 42 | 90 |
| HBA | 4-hydroxyalkylacrylate | −40 | 233 | 12.99 | 6 | 6 | 6 | 1 | 3 | 3 | | 18 | 36 | |
| ST | Styrene | 100 | 373 | 10.32 | | | | | | | 65 | 36 | 42 | |
| AN | Acrylonitrile | 85 | 358 | 11.21 | | | | | | | 25 | | | |
| EHA | Alkylacrylate(C8) | −50 | 223 | 9.22 | | | | 78 | | | | | | |
| GMA | Glycidylmethacrylate | 48 | 319 | 11.45 | | | | | | | | | | |

TABLE 2-continued

|  |  | Production Example 2-11 | Production Example 2-12 | Production Example 2-13 | Production Example 2-14 | Production Example 2-15 | Production Example 2-16 | Production Example 2-17 | Production Example 2-18 | Production Example 2-19 | Production Example 2-20 |
|---|---|---|---|---|---|---|---|---|---|---|---|
| * Amount (% by weight) |  | 47 | 47 | 47 | 87 | 20 | 94 | 0 | 0 | 0 | 0 |
| Solubility parameterSP(cal/cm$^3$)$^{1/2}$ | (Value calculated from values in Table) | 10.06 | 10.06 | 10.06 | 9.35 | 10.00 | 9.88 | 10.57 | 10.70 | 10.98 | 9.93 |
| Tg (°C.) | (Value calculated from values in Table) | 1 | 1 | 1 | −38 | 51 | −51 | 96 | 62 | 44 | 105 |
| Volume average particle diameter | μm | 0.12 | 0.32 | 0.19 | 0.19 | 0.11 | 0.11 | 0.11 | 0.11 | 0.11 | 0.11 |
| MEK insoluble content | Weight (%) | 98 | 96 | 99 | 99 | 98 | 98 | 98 | 98 | 98 | 98 |

*Amount: % by weight of alkyl (meth)acrylate having alkyl group of 4 to 10 carbons in shell layer

Examples 1 to 16 and Comparative Examples 1 to 8

Preparation of Polyol Composition

Into a 1-L stirring tank kept at 25° C., 100 parts of methyl ethyl ketone (MEK) was charged, and then the latex containing core-shell polymer (B-1) obtained in Production Example 2-1 (corresponding to 30 parts of core-shell polymer) was also charged under stirring. After mixing uniformly, 150 parts of water was added at a feeding rate of 60 parts/min. Immediately after the completion of the addition, stirring was stopped and thus a slurry composed of buoyant aggregates and an aqueous phase containing an organic solvent was obtained. Subsequently, the aqueous phase was discharged through a discharge port at a lower portion of the tank while the aggregates containing some aqueous phase were left. To the resulting aggregates, 70 parts of MEK was added and mixed uniformly to obtain a dispersion in which a core-shell polymer was dispersed uniformly. The dispersion was added to a 500 ml glass container, and mixed with 45 parts of a polyol (A-I) (A-I component). MEK was removed from the mixture by using a rotary evaporator. Thus, a dispersion (a polyol composition) (I-1) in which a core-shell polymer was dispersed in an amount of 40% by weight in the polyol (A-I) was obtained (Example 1). In Example 16, 28 parts of a polyol (A-I)(A-2 component) was used, a dispersion (polyol composition) (I-16) in which a core-shell polymer (B) was dispersed in an amount of 52% by weight in the polyol (A-I) was obtained.

Examples 2 to 15 and Comparative Examples 1 to 8 were performed in the same manner as in Example 1 except that the components and blending amounts shown in Tables 3 and 4 were used. The obtained polyol compositions (I-1 to I-23) were mixed with MEK and the dispersibility of the core-shell polymer was evaluated. The blending amounts and the characteristics of the obtained polyol compositions (I-1 to I-23) are shown in Tables 3 and 4.

Further, 77.4 parts of the epoxy resin (D-1), 20.6 parts of a 1:1 mixture of epoxy resin curing agents (E-1) and (E-2), and 2 parts of each of the polyol compositions (I-1 to I-23) were uniformly mixed using a stirring device (rotation-revolution mixer, Awatori Rentaro, THINKY CORPORATION) to obtain an epoxy resin composition. The epoxy resin composition was left at room temperature for 24 hours and then left at 130° C. for 3 hours to obtain a cured product. The results of evaluating the toughness and glass transition temperature of the cured product are shown in Tables 3 and 4.

TABLE 3

|  |  |  |  |  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|---|---|
|  |  | Polyol composition |  |  | I-1 | I-2 | I-3 | I-4 | I-5 | I-6 | I-7 | I-8 | I-9 | I-10 | I-11 | I-12 |
| Blending amount (part by weight) | (A) | Polyol (A-I) | A-1 | Actcol D-2000 (Polyoxypropylenediol average molecular weight2000) | 45 | 45 | 45 | 45 | 45 | 45 | 45 | 45 | 45 | 45 |  | 45 |
|  |  |  | A-2 | Actcol D-1000 (Polyoxypropylenediol average molecular weight1000) |  |  |  |  |  |  |  |  |  |  |  |  |
|  |  |  | A-3 | Actcol D-3000 (Polyoxypropylenediol average molecular weight3000) |  |  |  |  |  |  |  |  |  |  |  |  |
|  |  |  | A-4 | Actcol EP-901P(EO adduct of polyoxypropylenetriol average molecular weight7020) |  |  |  |  |  |  |  |  |  |  | 45 |  |

TABLE 3-continued

|  |  |  |  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|---|
|  |  | A-5 | Actcol D-400 (Polyoxypropylenediol average molecular weight400) |  |  |  |  |  |  |  |  |  |  |  |  |
| (B) | Core shell polymer | B-1 |  | 30 |  |  |  |  |  |  |  |  |  |  |  |
|  |  | B-2 |  |  | 30 |  |  |  |  |  |  |  |  |  |  |
|  |  | B-3 |  |  |  | 30 |  |  |  |  |  |  |  |  |  |
|  |  | B-4 |  |  |  |  | 30 |  |  |  |  |  |  |  |  |
|  |  | B-5 |  |  |  |  |  | 30 |  |  |  |  |  |  |  |
|  |  | B-6 |  |  |  |  |  |  | 30 |  |  |  |  |  |  |
|  |  | B-7 |  |  |  |  |  |  |  | 30 |  |  |  |  |  |
|  |  | B-8 |  |  |  |  |  |  |  |  | 30 |  |  | 30 |  |
|  |  | B-9 |  |  |  |  |  |  |  |  |  | 30 |  |  |  |
|  |  | B-10 |  |  |  |  |  |  |  |  |  |  | 30 |  |  |
|  |  | B-11 |  |  |  |  |  |  |  |  |  |  |  |  | 30 |
|  |  | B-12 |  |  |  |  |  |  |  |  |  |  |  |  |  |
|  |  | B-13 |  |  |  |  |  |  |  |  |  |  |  |  |  |
|  |  | B-14 |  |  |  |  |  |  |  |  |  |  |  |  |  |
|  |  | B-15 |  |  |  |  |  |  |  |  |  |  |  |  |  |
|  |  | B-16 |  |  |  |  |  |  |  |  |  |  |  |  |  |
|  |  | B-17 |  |  |  |  |  |  |  |  |  |  |  |  |  |
|  |  | B-18 |  |  |  |  |  |  |  |  |  |  |  |  |  |
|  |  | B-19 |  |  |  |  |  |  |  |  |  |  |  |  |  |
|  |  | B-20 |  |  |  |  |  |  |  |  |  |  |  |  |  |
|  | Amount of core shell polymer in polyol composition (% by weight) |  |  | 40 | 40 | 40 | 40 | 40 | 40 | 40 | 40 | 40 | 40 | 40 | 40 |
| Evaluation | Dispersibility in polyol (pass or failure) |  |  | Pass | Pass | Pass | Pass | Pass | Pass | Pass | Pass | Pass | Pass | Pass | Pass |
|  | Toughness (J/m$^2$) |  |  | 520 | 500 | 650 | 530 | 550 | 540 | 550 | 510 | 500 | 460 | 720 | 470 |
|  | Glass transition temperature (° C.) |  |  | 130 | 130 | 130 | 130 | 130 | 130 | 130 | 130 | 129 | 130 | 130 | 130 |

TABLE 4

|  |  |  |  |  | Example 13 | Example 14 | Example 15 | Example 16 | Comparative Example 1 | Comparative Example 2 | Comparative Example 3 | Comparative Example 4 | Comparative Example 5 | Comparative Example 6 | Comparative Example 8 |
|---|---|---|---|---|---|---|---|---|---|---|---|---|---|---|---|
|  |  | Polyol composition |  |  | I-13 | I-14 | I-15 | I-16 | I-17 | I-18 | I-19 | I-20 | I-21 | I-22 | I-23 |
| Blending amount (part by weight) | (A) | Polyol (A-I) | A-1 | Actcol D-2000 (Polyoxypropylenediol average molecular weight2000) | 45 | 45 |  |  | 45 | 45 | 45 | 45 |  | 45 | 45 |
|  |  |  | A-2 | Actcol D-1000 (Polyoxypropylenediol average molecular weight1000) |  |  |  | 28 |  |  |  |  |  |  |  |
|  |  |  | A-3 | Actcol D-3000 (Polyoxypropylenediol average molecular weight3000) |  |  | 45 |  |  |  |  |  |  |  |  |
|  |  |  | A-4 | Actcol EP-901P(EO adduct of polyoxypropylenetriol average molecular weight7020) |  |  |  |  |  |  |  |  |  |  |  |
|  |  |  | A-5 | Actcol D-400 (Polyoxypropylenediol average molecular weight400) |  |  |  |  |  |  |  |  | 45 |  |  |
|  | (B) | Core shell polymer | B-1 |  |  |  |  |  |  |  |  |  |  |  |  |
|  |  |  | B-2 |  |  |  |  |  |  |  |  |  |  |  |  |
|  |  |  | B-3 |  |  |  |  |  |  |  |  |  |  |  |  |
|  |  |  | B-4 |  |  |  |  |  |  |  |  |  |  |  |  |
|  |  |  | B-5 |  |  |  |  |  |  |  |  |  |  |  |  |
|  |  |  | B-6 |  |  |  |  |  |  |  |  |  |  |  |  |
|  |  |  | B-7 |  |  |  |  |  |  |  |  |  |  |  |  |
|  |  |  | B-8 |  |  |  |  |  |  |  |  |  |  |  |  |
|  |  |  | B-9 |  |  |  |  |  |  |  |  |  |  |  |  |
|  |  |  | B-10 |  |  |  |  |  |  |  |  |  |  |  |  |

TABLE 4-continued

|  |  | Example 13 | Example 14 | Example 15 | Example 16 | Comparative Example 1 | Comparative Example 2 | Comparative Example 3 | Comparative Example 4 | Comparative Example 5 | Comparative Example 6 | Comparative Example 8 |
|---|---|---|---|---|---|---|---|---|---|---|---|---|
|  | B-11 |  |  |  |  |  |  |  |  |  |  |  |
|  | B-12 | 30 |  |  | 30 |  |  |  |  |  |  |  |
|  | B-13 |  | 30 |  |  |  |  |  |  |  |  |  |
|  | B-14 |  |  | 30 |  |  |  |  |  |  |  |  |
|  | B-15 |  |  |  |  | 30 |  |  |  |  |  |  |
|  | B-16 |  |  |  |  |  | 30 |  |  |  |  |  |
|  | B-17 |  |  |  |  |  |  | 30 |  |  |  |  |
|  | B-18 |  |  |  |  |  |  |  | 30 |  |  |  |
|  | B-19 |  |  |  |  |  |  |  |  | 30 | 30 |  |
|  | B-20 |  |  |  |  |  |  |  |  |  |  | 30 |
|  | Amount of core shell polymer in polyol composition (% by weight) | 40 | 40 | 40 | 52 | 40 | 40 | 40 | 40 | 40 | 40 | 40 |
| Evaluation | Dispersibility in polyol (pass or failure) | Pass | Pass | Pass | Pass | Failure | Failure | Failure | Failure | Pass | Failure | Failure |
|  | Toughness (J/m²) | 620 | 480 | 500 | 570 | 400 | 400 | 350 | 380 | 400 | 350 | 280 |
|  | Glass transition temperature (° C.) | 130 | 130 | 130 | 126 | 130 | 130 | 129 | 129 | 122 | 130 | 130 |

From results of Tables 3 and 4, in the polyol composition of one or more embodiments of the present invention, the core-shell polymer is uniformly dispersed in a high content. Also, the polyol composition can effectively improve the toughness of the epoxy resin and it is possible to obtain a high glass transition temperature.

Example 17

Preparation of Polyol Composition and Synthesis and Evaluation of Rigid Polyurethane Resin A dispersion (polyol composition) (I-24) in which the core-shell polymer (B-1) was dispersed in 40% by weight in the polyol (A-I) (component A-2) was obtained in the same manner as in Example 1. The obtained polyol composition (I-24) passed the evaluation of dispersibility of the core-shell polymer.

Subsequently, among the components shown in Table 5, the dispersion (I-24), the polyol (A-II) (component A-6), the chain extender (F-1), and the crosslinking agent (G-1) were weighed and uniformly mixed using a stirring device (rotation-revolution mixer, Awatori Rentaro, manufactured by THINKY CORPORATION) to obtain a polyol composition. Polyisocyanate (C-1) was added to the obtained polyol composition and uniformly mixed using the same stirring device, and the obtained mixture was quickly defoamed under reduced pressure to obtain a curable resin (polyurethane resin) composition. Immediately thereafter, the polyurethane resin composition was poured into a Teflon (registered trademark) coated mold of 150 mm×100 mm×5 mm and cured at 130° C. for 3 hours to obtain a plate composed of a rigid polyurethane resin. The obtained plate was used to evaluate the toughness. The results are shown in Table 5.

Comparative Examples 9 and 10

A dispersion (polyol composition) (I-25) in which the core-shell polymer (B-19) was dispersed in 25% by weight in polyol (A-I) (component A-2) was obtained in the same manner as in Example 1 except that, in Example 1, 45 parts of polyol was changed to 90 parts of polyol. The obtained dispersion passed the evaluation of dispersibility of the core-shell polymer. Similarly to Example 1, in the case of 45 parts of polyol, the obtained dispersion was failure in the evaluation of dispersibility of the core-shell polymer.

Subsequently, among the components shown in Table 5, the dispersion (I-25), the polyol (A-II) (component A-6), the chain extender (F-1), and the crosslinking agent (G-1) were weighed and uniformly mixed using a stirring device (rotation-revolution mixer, Awatori Rentaro, manufactured by THINKY CORPORATION) to obtain a polyol composition (polyurethane resin composition). In Comparative Example 10, a dispersion (I) was not used. Polyisocyanate (C-1) was added to the obtained polyol composition and uniformly mixed using the same stirring device, and the obtained mixture was quickly defoamed under reduced pressure to obtain a curable resin (polyurethane resin) composition. Immediately thereafter, the polyurethane resin composition was poured into a Teflon (registered trademark) coated mold of 150 mm×100 mm×5 mm and cured at 130° C. for 3 hours to obtain a plate composed of a rigid polyurethane resin. The obtained plate was used to evaluate the toughness. The results are shown in Table 5.

TABLE 5

|  |  |  |  |  | Example 17 | Comparative Example 9 | Comparative Example 10 |
|---|---|---|---|---|---|---|---|
| Blending amount (part by weight) | (A) | Polyol (A-II) | A-2 | Actcol D-1000 (Polyoxypropylenediol average molecular weight 1000) |  |  | 10.0 |
|  |  |  | A-6 | Tripropyleneglycol (Polyoxypropylenediol average molecular weight 192) | 15.0 | 15.0 | 15.0 |

TABLE 5-continued

|  |  |  |  |  | Example 17 | Comparative Example 9 | Comparative Example 10 |
|---|---|---|---|---|---|---|---|
|  | (I) | Dispersion containing (B) dispersed in (A-I) | I-24 | (B-1) 40% by weight (A-2) 60% by weight | 16.6 |  |  |
|  |  |  | I-25 | (B-19) 25% by weight (A-2) 75% by weight |  | 13.3 |  |
|  | (C) | Polyisocyanate | C-1 | Cosmonate M-200 (Polymethylenepolyphenylpolyisocyanate) | 144.7 | 145.0 | 154.1 |
|  | (F) | Chain extender | F-1 | 1,4-butandiol | 20.0 | 20.0 | 20.0 |
|  | (G) | Crosslinking agent | G-1 | Actol T-300(Polyoxypropylenetriol average molecular weight 300) | 55.0 | 55.0 | 55.0 |
|  |  |  |  | (Total) | 251.3 | 248.3 | 254.1 |
| Rate of composition (part by weight) | (A) | Polyol | A-2 | Actol D-1000 (Polyoxypropylenediol average molecular weight1000) | 10.0 | 10.0 | 10.0 |
|  |  |  | A-6 | Tripropyleneglycol (Polyoxypropylenediol average molecular weight 192) | 15.0 | 15.0 | 15.0 |
|  | (B) | Core shell polymer | B-1 |  | 6.6 |  |  |
|  |  |  | B-19 |  |  | 3.3 |  |
|  | (C) | Polyisocyanate | C-1 | Cosmonate M-200 (Polymethylenepolyphenylpolyisocyanate) | 144.7 | 145.0 | 154.1 |
|  | (F) | Chain extender | F-1 | 1,4-butandiol | 20.0 | 20.0 | 20.0 |
|  | (G) | Crosslinking agent | G-1 | Actol T-300 (Polyoxypropylenetriol average molecular weight 300) | 55.0 | 55.0 | 55.0 |
|  |  |  |  | (Total) | 251.3 | 248.3 | 254.1 |
|  |  | NCO/active hydrogen (OH) equivalent ratio |  |  | 1.05 | 1.05 | 1.05 |
| Evaluation |  | Toughness (J/m$^2$) |  |  | 2600 | 1600 | 700 |

From results of Table 5, when the polyol composition of one or more embodiments of the present invention is used, it is possible to introduce more core-shell polymers into the obtained rigid polyurethane resin and to exhibit more excellent toughness.

Examples 18 to 19 and Comparative Examples 11 to 12

Preparation of Polyol Composition and Synthesis and Evaluation of Flexible Polyurethane Resin Dispersions (polyol compositions) (I-24) to (I-26) in which the core-shell polymer (B-1), (B-11), or (B-19) was dispersed in 25% by weight or 40% by weight in the polyol (A-I) (component A-2) was obtained in the same manner as in Example 1. The obtained polyol compositions (I-24) to (I-26) passed the evaluation of dispersibility of the core-shell polymer.

Subsequently, among the components shown in Table 6, the polyol compositions (I-24) to (I-26) of the dispersion, the polyol (A-II) (component A-2), and the crosslinking agent (G-1) were weighed and uniformly mixed using a stirring device (rotation-revolution mixer, Awatori Rentaro, manufactured by THINKY CORPORATION) to obtain a polyol composition. In Comparative Example 12, the dispersion (I) was not used. The catalyst (H-1) was added to the obtained polyol composition, and the mixture was uniformly mixed using the same stirrer. Further, the polyisocyanate (C-2) was added thereto, and the mixture was uniformly mixed in the same manner. The obtained mixture was quickly defoamed under reduced pressure to obtain a curable resin (polyurethane resin) composition. Immediately thereafter, the polyurethane resin composition was poured into a Teflon (registered trademark) coated mold of 150 mm×100 mm×3 mm and cured at 80° C. for 3 hours, at 100° C. for 2 hours and at 120° C. for 2 hours to obtain a sheet composed of a flexible polyurethane resin. The obtained sheet was used to perform the tensile test. The results are shown in Table 6.

TABLE 6

|  |  |  |  |  | Example 18 | Example 19 | Comparative Example 11 | Comparative Example 12 |
|---|---|---|---|---|---|---|---|---|
| Blending amount (part by weight) | (A) | Polyol (A-II) | A-2 | Actcol D-1000(Polyoxypropylenediol average molecular weight1000) | 63.8 | 63.8 | 47.6 | 80.0 |
|  | (I) | Dispersion containing | I-24 | (B-1) 40% by weight (A-2) 60% by weight | 27.0 |  |  |  |

TABLE 6-continued

|  |  |  |  |  | Example 18 | Example 19 | Comparative Example 11 | Comparative Example 12 |
|---|---|---|---|---|---|---|---|---|
|  |  | (B) dispersed in (A-I) | I-26 | (B-11) 40% by weight (A-2) 60% by weight |  | 27.0 |  |  |
|  |  |  | I-25 | (B-19) 25% by weight (A-2) 75% by weight |  |  | 43.2 |  |
|  | (C) | Polyisocyanate | C-2 | Isophorone diisocyanate | 43.1 | 43.1 | 43.5 | 43.0 |
|  | (G) | Crosslinking agent | G-1 | Actol T-300(Polyoxypropylenetriol average molecular weight 300) | 20.0 | 20.0 | 20.0 | 20.0 |
|  | (H) | Catalyst | H-1 | U-CAT SA102 (octyl acid salt of 1,8-diazabicyclo [5.4.0] undecene-7] | 1.0 | 1.0 | 1.0 | 1.0 |
|  |  | (Total) |  |  | 154.9 | 154.9 | 155.3 | 144.0 |
| Rate of composition (part by weight) | (A) | Polyol | A-2 | Actol D-1000(Polyoxypropylenediol average molecular weight1000) | 80.0 | 80.0 | 80.0 | 80.0 |
|  | (B) | Core shell polymer | B-1 |  | 10.8 |  |  |  |
|  |  |  | B-11 |  |  | 10.8 |  |  |
|  |  |  | B-19 |  |  |  | 10.8 |  |
|  | (C) | Polyisocyanate | C-1 | Isophorone diisocyanate | 43.1 | 43.1 | 43.5 | 43.0 |
|  | (G) | Crosslinking agent | G-1 | Actol T-300 (Polyoxypropylenetriol average molecular weight300) | 20.0 | 20.0 | 20.0 | 20.0 |
|  | (H) | Catalyst | H-1 | U-CAT SA102 (octyl acid salt of 1,8-diazabicyclo [5.4.0] undecene-7] | 1.0 | 1.0 | 1.0 | 1.0 |
|  |  | (Total) |  |  | 154.9 | 154.9 | 155.3 | 144.0 |
|  |  | NCO/active hydrogen (OH) equivalent ratio |  |  | 1.1 | 1.1 | 1.1 | 1.1 |
| Evaluation |  | Tensile strength (MPa) |  |  | 9.3 | 11.3 | 7.2 | 6.1 |
|  |  | Tensile strength at 100% elongation (MPa) |  |  | 3.3 | 4.5 | 2.4 | 2.0 |
|  |  | Elongation of tensile break: 250% or more Pass |  |  | Pass | Pass | Pass | Pass |

From results of Table 6, the flexible polyurethane resin synthesized using the polyol composition of one or more embodiments of the present invention has excellent mechanical characteristics (tensile strength, tensile strength at 100% elongation, tensile break).

Example 20 and Comparative Examples 13 and 14

Into a four-necked glass container equipped with a reflux condenser, a nitrogen inlet, an additional inlet for raw materials, and a thermometer, the polyols (A-II) (component A-2) and (component A-7) and the dispersion (I-24) or (I-25) were charged in the amounts shown in Table 7. While the mixture was stirred, it was kept warm at 60° C., and dry nitrogen was blown for 1 hour. Thereafter, the polyisocyanate (C-3) was charged in the amount shown in Table 7. The temperature was raised to 130° C., and stirring was continued for 4 hours under nitrogen to obtain a prepolymer. After cooling to 80° C., the chain extender (F-1) was added to this prepolymer in the amount shown in Table 7 and stirring was continued to such an extent that stirring was difficult. The obtained polymer was scraped off from the reaction vessel, placed in an oven at 100° C., and kept under reduced pressure for 4 hours to obtain a thermoplastic urethane elastomer. In Comparative Example 14, the dispersion (I) was not used.

Subsequently, the obtained thermoplastic urethane elastomer was rolled at room temperature to produce a sheet. The produced sheet was hot-pressed at 160° C. to obtain a sheet having a thickness of 2 mm. After annealing the obtained sheet at 100° C. for 20 hours, this annealed sheet was used to perform a tensile test (tensile strength test at 500% elongation). The results are shown in Table 7.

TABLE 7

|  |  |  |  |  | Example 20 | Comparative Example 13 | Comparative Example 14 |
|---|---|---|---|---|---|---|---|
| Blending amount (part by weight) | (A) | Polyol (A-II) | A-2 | Actcol D-1000 (Polyoxypropylenediol average molecular weight1000) | 11.4 | 4.7 | 18.2 |
|  |  |  | A-7 | PTMG 1000 (Polytetramethyleneglycol average molecular weight1000) | 73.0 | 73.0 | 73.0 |

TABLE 7-continued

| | | | | | Example 20 | Comparative Example 13 | Comparative Example 14 |
|---|---|---|---|---|---|---|---|
| | (I) | Dispersion containing (B) dispersed in (A-I) | I-24 | (B-1) 40% by weight (A-2) 60% by weight | 11.3 | | |
| | | | I-25 | (B-19) 25% by weight (A-2) 75% by weight | | 18.0 | |
| | (C) | Polyisocyanate | C-3 | 4,4'diphenylmethanediisocyanate | 45.2 | 45.4 | 45.2 |
| | (F) | Chain extender | F-1 | 1,4-butandiol | 8.8 | 8.8 | 8.8 |
| | | | | (Total) | 150 | 150 | 145 |
| Rate of composition (part by weight) | (A) | Polyol | A-2 | Actol D-1000 (Polyoxypropylenediol average molecular weight1000) PTMG 1000 | 18.2 | 18.2 | 18.2 |
| | | | A-7 | Actol D-1000 (Polytetramethyleneglycol average molecular weight1000) | 73.0 | 73.0 | 73.0 |
| | (B) | Core shell polymer | B-1 | | 4.5 | | |
| | | | B-19 | | | 4.5 | |
| | (C) | Polyisocyanate | C-3 | 4,4'-diphenylmethanediisocyante | 45.2 | 45.4 | 45.2 |
| | (F) | Chain extender | F-1 | 1,4-butandiol | 8.8 | 8.8 | 8.8 |
| | | | | (Total) | 150 | 150 | 145 |
| | | | | NCO/active hydrogen (OH) equivalent ratio | 1.0 | 1.0 | 1.0 |
| Evaluation | | | | Tensile strength at 500% elongation (MPa) | 35 | 25 | 9 |

From results of Table 7, the thermoplastic urethane elastomer synthesized using the polyol composition of one or more embodiments of the present invention has excellent mechanical characteristics (tensile strength at 500% elongation).

Example 21

83 parts of the polyol (A-II) (component A-4), 19 parts of the dispersion (I-11), 6 parts of the crosslinking agent (G-l), 3 parts of pure water, 0.02 part of the catalyst (H-2), and 0.2 part of the catalyst (H-3) were uniformly mixed using the stirring device (Awatori Rentaro, manufactured by THINKY CORPORATION) to obtain a composition. This composition and 11 parts of the polyisocyanate (C) (component C-4: tolylene diisocyanate (Cosmonate T-80, manufactured by Mitsui Chemicals, Inc.)) were mixed using the stirring device. The mixture was poured into a box-like mold pre-heated to 40° C. to obtain a flexible foamed urethane. The thus-obtained foamed urethane was extremely good in appearance and hand feeling.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A polyol composition comprising:
   a first polyol (A-I) having a number average molecular weight of 1000 to 10000; and
   35 to 60% by weight of a core-shell polymer (B) comprising a core layer and a shell layer,
   wherein the core-shell polymer is uniformly dispersed in the first polyol (A-I) and has a volume average particle diameter of 0.01 to 0.6 μm,
   wherein a polymer constituting the shell layer has a solubility parameter of 9.30 to 10.20 $(cal/cm^3)^{1/2}$ and comprises at least 25 to 90% by weight of an alkyl (meth)acrylate unit having a linear or branched alkyl group of 4 to 10 carbons.

2. The composition according to claim 1, wherein the first polyol (A-I) is a polyetherpolyol.

3. The composition according to claim 1, wherein the first polyol (A-I) is at least one selected from the group consisting of polyoxypropylenediol, polyoxypropylenetriol, polyoxybutylenediol, and polyoxybutylenetriol.

4. The composition according to claim 1, wherein the core layer is selected from the group consisting of diene rubber, (meth)acrylate rubber, organosiloxane rubber, and styrene polymer.

5. The composition according to claim 1, wherein the polymer constituting the shell layer also has a glass transition temperature of −40° C. to 60° C.

6. The composition according to claim 1, wherein the core-shell polymer (B) comprises 70 to 95% by weight of the core layer.

7. The composition according to claim 1, wherein the polymer constituting the shell layer further comprises 0 to 14% by weight of a hydroxyl group-containing (meth)acrylate unit.

8. A polyurethane resin comprising:
   the composition of claim 1, and
   a product obtained by reacting a second polyol (A-II) having a number average molecular weight of 100 to 10000 and a polyisocyanate (C).

9. An epoxy resin composition comprising:
   the composition of claim 1,
   an epoxy resin (D), and
   an epoxy resin curing agent (E).

10. A cured product comprising the epoxy resin composition according to claim 9.

11. The composition according to claim 2, wherein the polyetherpolyol is at least one selected from the group consisting of polyoxypropylenediol, polyoxypropylenetriol, polyoxybutylenediol, and polyoxybutylenetriol.

12. The composition according to claim 2, wherein the core layer is selected from the group consisting of diene rubber, (meth)acrylate rubber, organosiloxane rubber, and styrene polymer.

13. The composition according to claim 2, wherein the polymer constituting the shell layer also has a glass transition temperature of −40° C. to 60° C.

14. The composition according to claim 3, wherein the polymer constituting the shell layer also has a glass transition temperature of −40° C. to 60° C.

15. The composition according to claim 4, wherein the polymer constituting the shell layer also has a glass transition temperature of −40° C. to 60° C.

16. The composition according to claim 2, wherein the core-shell polymer (B) comprises 70 to 95% by weight of the core layer.

17. The composition according to claim 2, wherein the polymer constituting the shell layer further comprises 0 to 14% by weight of a hydroxyl group-containing (meth)acrylate unit.

18. A polyurethane resin comprising:
the composition of claim 2, and
a product obtained by reacting a second polyol (A-II) having a number average molecular weight of 100 to 10000 and a polyisocyanate (C).

19. An epoxy resin composition comprising:
the composition of claim 2,
an epoxy resin (D), and
an epoxy resin curing agent (E).

20. The composition according to claim 1, wherein monomers forming the shell layer comprise:
25 to 90% by weight of the alkyl (meth)acrylate having a linear or branched alkyl group of 4 to 10 carbons,
10 to 75% by weight of an alkyl (meth)acrylate having a linear or branched alkyl group of 1 to 3 carbons, and
1 to 14% by weight of a hydroxyl group-containing (meth)acrylate.

21. The composition according to claim 1, wherein the alkyl(meth)acrylate unit is one or more of the group consisting of n-butyl(meth)acrylate, pentyl(meth)acrylate, hexyl(meth)acrylate, heptyl(meth)acrylate, octyl(meth)acrylate, nonyl(meth)acrylate, decyl(meth)acrylate, isobutyl(meth)acrylate, s-butyl(meth)acrylate, t-butyl(meth)acrylate, isopentyl(meth)acrylate, 2-ethylhexyl(meth)acrylate, isooctyl(meth)acrylate, isononyl(meth)acrylate, and isodecyl(meth)acrylate.

* * * * *